US011271465B2

(12) United States Patent
Kitahara et al.

(10) Patent No.: US 11,271,465 B2
(45) Date of Patent: Mar. 8, 2022

(54) ACTUATOR HAVING A VISCOELASTIC MEMBER ARRANGED FOR A MOVEABLE BODY

(71) Applicant: NIDEC SANKYO CORPORATION, Nagano (JP)

(72) Inventors: Hiroshi Kitahara, Nagano (JP); Tadashi Takeda, Nagano (JP); Masao Tsuchihashi, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 131 days.

(21) Appl. No.: 16/627,338

(22) PCT Filed: Jun. 11, 2018

(86) PCT No.: PCT/JP2018/022169
§ 371 (c)(1),
(2) Date: Dec. 30, 2019

(87) PCT Pub. No.: WO2019/003873
PCT Pub. Date: Jan. 3, 2019

(65) Prior Publication Data
US 2020/0161955 A1 May 21, 2020

(30) Foreign Application Priority Data
Jun. 30, 2017 (JP) .............................. JP2017-128673

(51) Int. Cl.
*H02K 33/16* (2006.01)
*H02K 33/06* (2006.01)
(Continued)

(52) U.S. Cl.
CPC ............. *H02K 33/16* (2013.01); *H02K 33/06* (2013.01); *H02K 1/34* (2013.01); *H02K 5/04* (2013.01); *H02K 5/24* (2013.01); *H02K 33/00* (2013.01)

(58) Field of Classification Search
CPC .. H02K 1/34; H02K 5/04; H02K 5/24; H02K 33/00; H02K 33/02; H02K 33/06; H02K 33/16; H02K 41/02; B06B 1/045
(Continued)

(56) References Cited

U.S. PATENT DOCUMENTS 10,252,295 B2  4/2019  Takeda et al.
10,411,575 B2  9/2019  Takeda et al.
(Continued)

FOREIGN PATENT DOCUMENTS

CN  106104992  11/2016
CN  106471719  3/2017
(Continued)

OTHER PUBLICATIONS

"International Search Report (Form PCT/ISA/210) of PCT/JP2018/022169," dated Jul. 3, 2018, with English translation thereof, pp. 1-2.
(Continued)

*Primary Examiner* — Rashad H Johnson
(74) *Attorney, Agent, or Firm* — JCIPRNET

(57) ABSTRACT

In the actuator, the viscoelastic members are arranged at positions at which the support body and the movable body face each other in the first direction, and the magnetic drive circuit drives the movable body in the second direction which crosses the first direction. The viscoelastic members connect the movable body and the support body together while having the thickness direction thereof in the first direction and extending in the second direction. Therefore,
(Continued)

resonance caused when the movable body is vibrated can be restricted. Reproducibility of vibration acceleration corresponding to the input signals can be improved by utilizing the spring elements of the viscoelastic members in the shearing direction, thus enabling the actuator to vibrate with delicate nuances. Further, the viscoelastic members can be prevented from being pressed in the thickness direction and greatly deformed, therefore, preventing the gap between the movable body and the support body from greatly varying.

4 Claims, 19 Drawing Sheets

(51) Int. Cl.
 *H02K 1/34* (2006.01)
 *H02K 33/00* (2006.01)
 *H02K 5/04* (2006.01)
 *H02K 5/24* (2006.01)

(58) Field of Classification Search
 USPC ............... 310/10, 15–17, 25, 28, 36–37, 51
 See application file for complete search history.

(56) References Cited

U.S. PATENT DOCUMENTS

| | | | |
|---|---|---|---|
| 10,596,595 B2* | 3/2020 | Hua | B06B 1/045 |
| 2007/0188199 A1* | 8/2007 | Park | G11B 9/1436 |
| | | | 327/108 |
| 2011/0062804 A1* | 3/2011 | Lee | H02K 33/18 |
| | | | 310/30 |
| 2017/0310203 A1 | 10/2017 | Takeda et al. | |
| 2021/0067021 A1* | 3/2021 | Maeda | H02K 33/18 |

FOREIGN PATENT DOCUMENTS

| | | |
|---|---|---|
| CN | 106575913 | 4/2017 |
| JP | 2017060207 | 3/2017 |
| WO | 2016104349 | 6/2016 |

OTHER PUBLICATIONS

"Office Action of China Counterpart Application", dated Dec. 23, 2020, with English translation thereof, pp. 1-14.

\* cited by examiner

ACTUATOR HAVING A VISCOELASTIC MEMBER ARRANGED FOR A MOVEABLE BODY

CROSS-REFERENCE TO RELATED APPLICATION

This application is a 371 application of the international PCT application serial no. PCT/JP2018/022169, filed on Jun. 11, 2018, which claims the priority benefits of Japan application no. 2017-128673 filed on Jun. 30, 2017. The entirety of each of the abovementioned patent applications is hereby incorporated by reference herein and made a part of this specification.

TECHNICAL FIELD

The present invention relates to an actuator for generating various kinds of vibrations.

BACKGROUND ART

As an apparatus for generating vibrations with a magnetic drive mechanism, an actuator has been proposed in which a movable body is vibrated relative to a support body in an axial direction by a magnetic drive circuit equipped with coils and magnets. It is proposed that in this kind of actuator, the support body and the movable body be connected via a viscoelastic member to properly drive the movable body. In Patent Literature 1, for example, a movable body is supported to be movable relative to a support body (a fixed body) in an axial direction and a silicone gel (a gel-based damper member) is interposed between the support body and the movable body. By using a viscoelastic member made of a silicone gel, for example, resonance caused when the movable body is driven can be restrained.

CITATION LIST

Patent Literature

Patent Literature 1: Japanese Unexamined Patent Publication No. 2017-60207

SUMMARY

Problems to be Solved by the Invention

In an actuator of Patent Literature 1, a magnetic drive circuit is equipped with magnets and coils which are arranged coaxially. Viscoelastic members are interposed between the inside circumferential surface of a support body (a fixed body) and the outside circumferential surface of a movable body, surrounding the center axis of the movable body.

Besides the above, another configuration for an actuator which causes vibrations with a magnetic drive circuit equipped with coils and magnets has been proposed with a magnetic drive circuit in which flat coils and plate magnets face each other in the first direction and a movable body is vibrated in the second direction perpendicular to the first direction. Even in this type of actuator, it is desirable that a movable body be properly driven by using the characteristics of the viscoelastic members properly.

Considering the above problems, an objective of the present invention is to provide an actuator in which viscoelastic members are properly arranged between a support body and a movable body to properly drive the movable body.

Means for Solving the Problem

To solve the above problems, an actuator to which the present invention is applied includes: a support body; a movable body supported to be movable relative to the support body; a magnetic drive circuit, having a coil and a magnet which faces the coil in a first direction to move the movable body relative to the support body in a second direction crossing the first direction; and a viscoelastic member, arranged at a position at which the support body and the movable body face each other in the first direction. The viscoelastic member is positioned having a thickness direction thereof in the first direction; and when the movable body is moved relative to the support body in the second direction, the viscoelastic member deforms in the shear direction.

In the present invention, the viscoelastic member is arranged at a position at which the support body and the movable body face each other in the first direction, and the magnetic drive circuit drives the movable body in the second direction which crosses the first direction. The viscoelastic member is arranged with the thickness direction thereof in the first direction; when the movable body is moved relative to the support body in the second direction, the viscoelastic member deforms in the direction (the shearing direction) which crosses the thickness direction (the axial direction). Therefore, resonance caused when the movable body is vibrated can be restrained. Also, the deformation of the viscoelastic member in the shearing direction happens in the direction in which the viscoelastic member is pulled and stretched; therefore, the viscoelastic member demonstrates the deformation characteristics in which a linear component (a spring coefficient) is larger than a nonlinear component (a spring coefficient). Therefore, the viscoelastic member demonstrates consistent spring force in any direction of motion. Accordingly, when the movable body is driven in the direction crossing the first direction, the spring element of the viscoelastic member in the shearing direction is utilized to improve reproducibility of vibration acceleration corresponding to the input signal. Therefore, vibrations can be actualized with delicate nuances.

Also, in the present invention, when the viscoelastic member is pressed and compressively deformed in the thickness direction (the axial direction) between the movable body and the support body, the viscoelastic member demonstrates the stretch characteristics in which a nonlinear component (a spring coefficient) is larger than a linear component (a spring coefficient). Therefore, the viscoelastic member is restrained from greatly deforming in the direction which perpendicularly intersects with the driving direction of the movable body, thus preventing a gap between the movable body and the support body from greatly varying.

The present invention may adopt a configuration in which the coil is a flat coil having its thickness direction in the first direction, the magnet is a plate magnet having its thickness direction in the first direction, and the viscoelastic member extends in a direction which perpendicularly intersects with the first direction. With this configuration, the magnetic drive circuit and the viscoelastic member are thin in the first direction; therefore, the actuator can be configured to be thin in the direction perpendicularly intersecting with the driving direction (the second direction).

The present invention also may adopt a configuration in which the support body is provided with a first cover member arranged on one side of the movable body in the first direction and a second cover member arranged on the other side of the movable body in the first direction. The viscoelastic member is arranged between the movable body and the first cover member, and between the movable body and the second cover member. With this configuration, the viscoelastic member can be arranged to deform in the shearing direction when the movable body is vibrated in the second direction. Also, the movable body can be supported evenly at both sides of the movable body in the first direction.

The present invention may adopt a configuration in which the movable body is provided with multiple yokes, which appear layered when viewed in the first direction, and joining members which position and join the multiple yokes in the first direction; the support body is provided with a first cover arranged on one side of the multiple yokes in the first direction and a second cover member positioned on the other side of the multiple yokes in the first direction. The viscoelastic member is arranged between an assembly of the multiple yokes which are joined together by the joining members and the first cover member, and between the assembly of the multiple yokes which are joined together by the joining members and the second cover member. With this configuration, the viscoelastic member can be arranged so as to deform in the shearing direction when the movable body is vibrated in the second direction. Also, the assembly of the multiple yokes can be supported evenly from both sides in the first direction. Further, the multiple yokes can be positioned within the dimension tolerance of one member (the joining member) to avoid accumulation of component tolerance of the multiple yokes in the first direction. With this configuration, a gap between the assembly and the first cover member and a gap between the assembly and the second cover member can be prevented from greatly varying. Therefore, the viscoelastic member responds to the movement of the movable body with certainty, thus effectively preventing resonance of the movable body.

The present invention may adopt a configuration in which the support body is provided with a holder for holding the coil or the magnet; and the viscoelastic member is arranged at a place at which the holder and the movable body face each other in the first direction. With this configuration, there is no need to provide space for arranging the viscoelastic member between the movable body and the cover. Therefore, the actuator can be made thinner. Also, since the viscoelastic member can be mounted before mounting the cover, the vibration characteristics including a damper performance can be inspected before the cover is installed.

In the present invention, it is preferred that the viscoelastic member is arranged while compressed in the first direction. With this configuration, the viscoelastic member responds to the movement of the movable body with certainty, effectively preventing the movable body from resonating.

In the present invention, it is preferred that the support body be provided with a protrusion protruding from a surface thereof, to which the viscoelastic member is connected, toward the movable body. With this configuration, a compression collapse of the viscoelastic member in the first direction can be limited.

The present invention may adopt a configuration in which a portion of the support body that the viscoelastic member contacts is made a recess portion. With this configuration, the position of the viscoelastic member will not easily be shifted.

The present invention may adopt a configuration in which the viscoelastic member is a gel-based damper member. By using the gel-based damper member, the viscoelastic member can demonstrate the stretch characteristics in which a linear component (a spring coefficient) is larger than a nonlinear component (a spring coefficient) when pulled and stretched in the thickness direction (the axial direction). On the other hand, when deformed in the direction (the shearing direction) crossing the thickness direction (the axial direction), the viscoelastic member deforms in whichever direction it is pulled and stretched; thus, it exhibits the deformation characteristics in which a linear component (a spring coefficient) is larger than a nonlinear component (a spring coefficient).

Effect of the Invention

In the present invention, the viscoelastic member is arranged at a position at which the support body and the movable body face each other in the first direction, and a magnetic drive circuit drives the movable body in the second direction which crosses the first direction. Also, the viscoelastic member extends in the second direction having the thickness direction thereof in the first direction; when the movable body moves relative to the support body in the second direction, the viscoelastic member deforms in the direction (the shearing direction) which crosses the thickness direction (the axial direction). Therefore, resonance caused when the movable body is vibrated can be restrained by the viscoelastic member. Also, the deformation of the viscoelastic member in the shearing direction happens in the direction in which the viscoelastic member is pulled and stretched, demonstrating the deformation characteristics in which a linear component (a spring coefficient) is larger than a nonlinear component (a spring coefficient). Thus, the viscoelastic member demonstrates consistent spring force in any direction of motion. For this reason, in the present invention, reproducibility of vibration acceleration corresponding to the input signals can be improved by taking advantage of the spring element of the viscoelastic member in the shearing direction, actualizing vibrations with delicate nuances.

DESCRIPTION OF EMBODIMENTS

Figure 1:
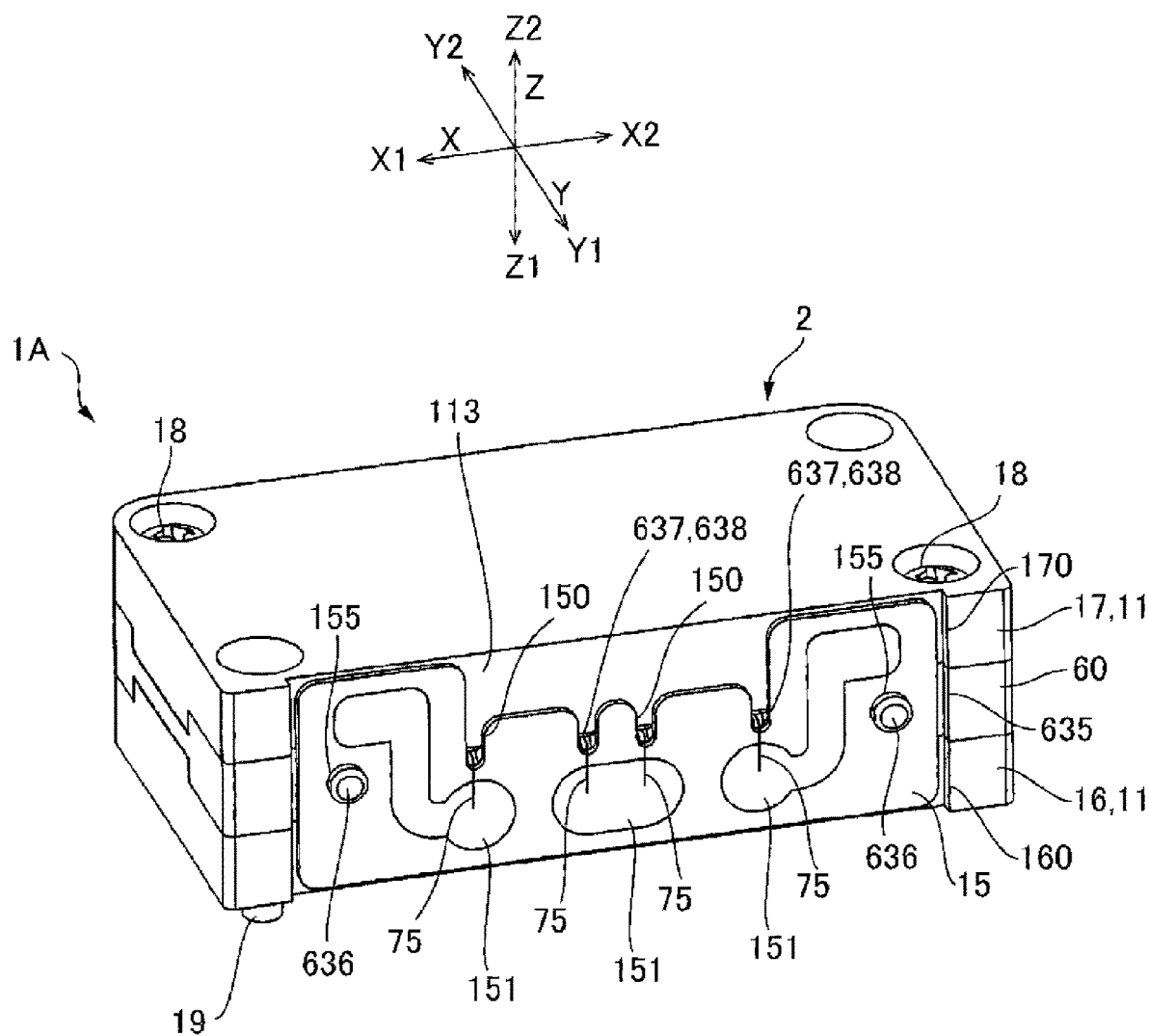
FIG. 1 is a perspective view of an actuator of Embodiment 1 of the present invention.

Embodiments 1 through 5 of the present invention are described hereafter referring to the drawings. Note that, in the description below, the directions crossing each other are defined as a first direction Z, a second direction X and a third direction Y. Also, the first direction Z, the second direction X and the third direction Y perpendicularly intersect with each other. One side in the second direction X is given X1, the other side in the second direction X is given X2, one side in the third direction Y is given Y1, the other side in the third direction Y is given Y2, one side in the first direction Z is given Z1, and the other side in the first direction is given Z2.

An actuator of Embodiments 1 through 5 to which the present invention is applied has a magnetic drive circuit 6 which moves a movable body 3 relative to a support body 2 and a viscoelastic member 9 which connects the support body 2 and the movable body 3; the magnetic drive circuit 6 has coils 7 and magnets 8. Since the basic configuration of the actuator in Embodiments 1 through 5 is the same; therefore, the same reference numerals are given to the corresponding parts in the description. In the present invention, the magnetic drive circuit 6 may be configured to drive the movable body 3 either in the second direction X or the third direction Y or both directions. The magnetic drive circuit 6 may be configured such that the coils 7 are arranged to the support body 2 and the magnets 8 are arranged to the movable body 3 or the magnets 8 are arranged to the support body 2 and the coils 7 are arranged to the movable body 3. The description below mainly uses the configuration in which the coils 7 are arranged to the support body 2 while the magnets 8 are arranged to the movable body 3.

In the actuator of Embodiments 1 through 5, when an alternating current is applied to the coils 7, the movable body 3 is vibrated in the second direction X; therefore, the center of gravity in the actuator shifts in the second direction X. For this reason, a user can feel vibrations in the second direction X. At that time, if the AC waveform applied to the coils 7 is adjusted to differentiate the acceleration at which the movable body 3 moves to one side X1 in the second direction X from the acceleration at which the movable body 3 moves to the other side X2 in the second direction X, a user can feel vibrations having directionality in the second direction X. Embodiment 5 may adopt a configuration in which the movable body 3 is driven in the third direction Y, and even other Embodiments may adopt a configuration in which the movable body 3 is driven in the third direction Y.

In Embodiments 1 through 5, a viscoelastic member 9 is a gel-based damper member composed of silicone gel, etc. Viscoelasticity means the compounded characteristics of viscosity and elasticity, which is remarkably found in a polymer substance such as a gel-based, a plastic or a rubber member. Therefore, various kinds of gel-based members can be used for the viscoelastic member 9. Also, the viscoelastic member 9 may use various rubber materials and their modified materials such as natural rubber, diene-based rubber (such as styrene butadiene rubber, isoprene rubber or butadiene rubber, chloroprene rubber, acrylonitrile butadiene rubber, etc.) non-diene-based rubber (such as butyl rubber, ethylene propylene rubber, ethylene propylene diene rubber, urethane rubber, silicone rubber, fluororubber, etc.) or thermoplastic elastomer, etc. In Embodiments 1 through 5, the viscoelastic member 9 (a first viscoelastic member 91 and a second viscoelastic member 92) is composed of a silicone-based gel with penetration of 10° to 110°. Penetration is defined by JIS-K-2207 or JIS-K-2220, where the smaller the value is, the harder the material is. The viscoelastic member 9 has linear or nonlinear stretch characteristics according to its stretching direction. For example, the viscoelastic member 9 demonstrates the stretch characteristics in which a nonlinear component (a spring coefficient) is larger than a linear component (a spring coefficient) when pressed and compressively deformed in its thickness direction (the axial direction). On the other hand, when pulled and stretched in the thickness direction (the axial direction), it demonstrates the stretch characteristics in which a linear component (a spring coefficient) is larger than a nonlinear component (a spring coefficient). However, the deformation of the viscoelastic member 9 in the direction (the shearing direction) crossing the thickness direction is the deformation of pulling and stretching no matter which direction the movable body 3 moves; therefore, at the time, the viscoelastic member 9 demonstrates the stretch characteristics in which a linear component (a spring coefficient) is larger than a nonlinear component (a spring coefficient). Therefore, the viscoelastic member 9 demonstrates consistent spring force in any direction of motion. Therefore, reproducibility of vibratory acceleration corresponding to the input signals can be improved by utilizing the spring element of the viscoelastic body 9 in the shearing direction, enabling it to produce vibrations with delicate nuances.

Embodiment 1

Figure 2:
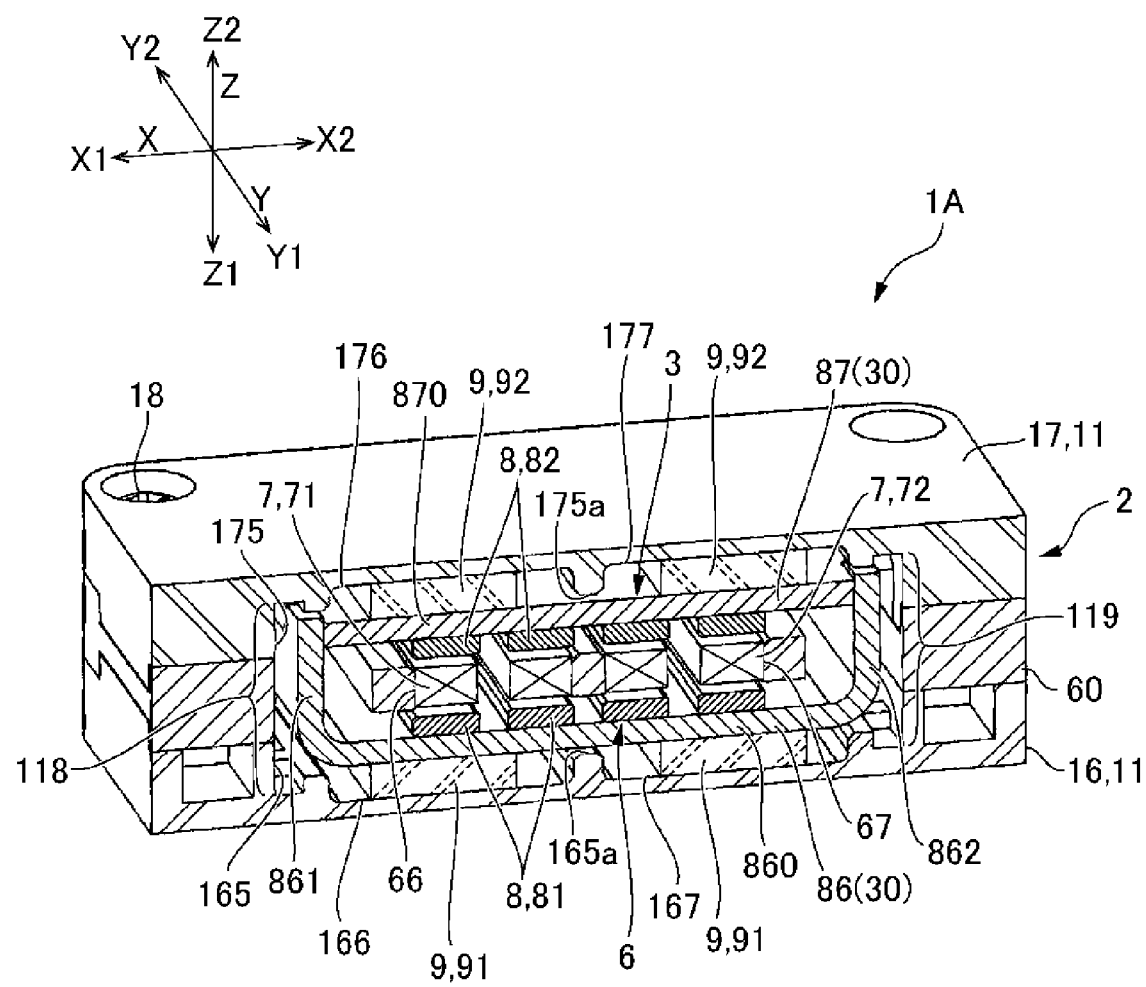
FIG. 2 is an XZ cross-sectional view of the actuator of Embodiment 1.
Figure 3:
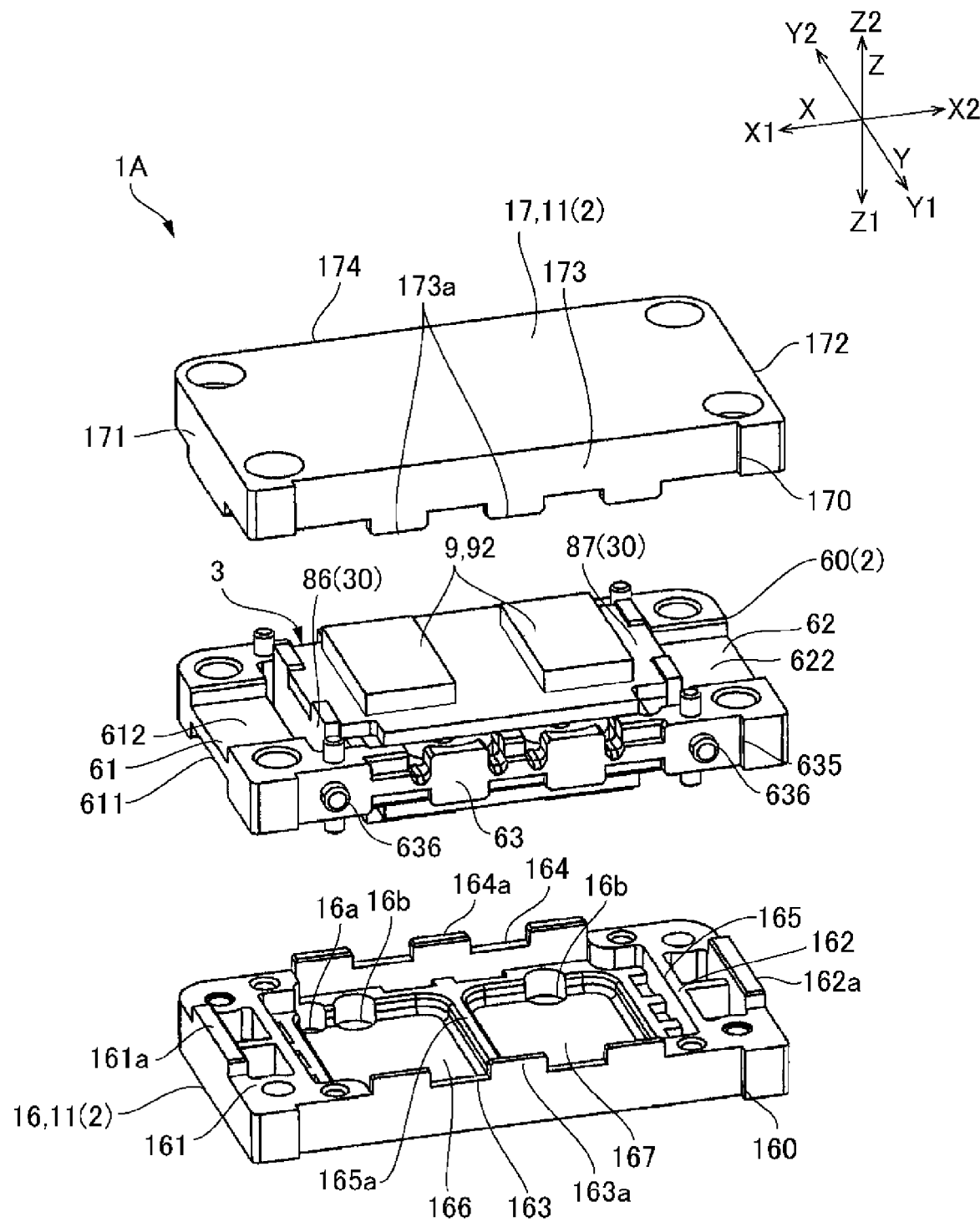
FIG. 3 is a perspective exploded view of the actuator of Embodiment 1.

FIG. 1 is a perspective view of an actuator 1A of Embodiment 1 of the present invention. FIG. 2 is an XZ cross section of the actuator 1A of Embodiment 1. FIG. 3 is a perspective exploded view of the actuator 1A of Embodiment 1. As shown in FIG. 1 and FIG. 2, the actuator 1A of Embodiment 1 is in a rectangular parallelepiped shape having the dimension in the second direction X longer than that in the third direction Y overall; a magnetic drive circuit 6 vibrates a movable body 3 in the second direction X.

(Support Body)

As shown in FIG. 1, FIG. 2 and FIG. 3, in the actuator 1A of Embodiment 1, the support body 2 has a cover 11 and a holder 60. Inside of the cover 11, the movable body 3 and the magnetic drive circuit 6, which are shown in FIG. 2, are arranged. The cover 11 consists of a first cover member 16 positioned on one side Z1 in the first direction Z and a second cover member 17 laid on the first cover member 16 from the other side Z2 in the first direction Z. The first cover member 16, the holder 60 and the second cover member 17 are each in a quadrangle planar shape and are layered in the first direction Z. In Embodiment 1, the first cover member 16, the holder 60 and the second cover member 17 are layered in the first direction Z and fastened in the first direction Z by screws 18 which are arranged on a pair of diagonal positions. Thus, the support body 2 is completed. Note that, screws 19 are fastened at the other diagonal positions in the support body 2 to fix the actuator 1a to a frame of an apparatus when mounting the actuator 1A in the apparatus.

In each side surface 113 of the first cover member 16, the holder 60 and the second cover member 17 on one side Y1 in the third direction Y, a recess portion 160, a recess portion 635 and a recess portion 170 are respectively created so that a wiring board is to be fixed therein. Protrusions 636 formed to the recess portion 635 of the holder 60 are fitted to positioning holes 155 in the wiring board 15 to position the wiring board 15, and then the wiring board 15 is fixed by an adhesive, etc.

As shown in FIG. 2 and FIG. 3, a quadrangle recess 165 that opens to the other side Z2 in the first direction Z is formed in the first cover member 16. At the bottom portion of the recess 165, two recess portions 166 and 167 are further created side by side in the second direction X. As shown in FIG. 3, in the first cover member 16, the recess 165 is surrounded by a first wall 161 positioned on one side X1 in the second direction X, a second wall part 162 positioned on the other side X2 in the second direction X, a third wall part 163 positioned on one side Y1 in the third direction Y and a fourth wall part 164 positioned on the other side Y2 in the third direction Y. The recess portion 160 extending along the second direction X is formed on the outside surface of the third wall part 163. To the third wall part 163 and the fourth wall part 164, multiple protruding plate portions 163a, 164a protruding toward the other side Z2 in the first direction Z are formed at predetermined distance along the second direction X. Also, a protruding plate portion 161a, 162a is respectively formed to the first wall 161, the second wall part 162, each protruding to the other side Z2 in the first direction Z from the center in the third direction Y of the outside edge.

The second cover member 17 is formed symmetric to the first cover member 16 in the first direction Z. As shown in FIG. 2, a quadrangle recess 175 opening to one side Z1 in the first direction Z is formed in the second cover member 17. At the bottom of the recess 175, two recess portions 176 and 177 are further created side by side in the second direction X. As shown in FIG. 3, in the second cover member 17, the recess 175 is surrounded by a first wall part 171 positioned on one side X1 in the second direction X, a second wall part 172 positioned on the other side X2 in the second direction X, a third wall part 173 positioned on one side Y1 in the third direction Y, and a fourth wall part 174 positioned on the other side Y2 in the third direction Y. A recess portion 170 extending along the second direction X is formed on the outside surface of the third wall 173.

To the third wall part 173, multiple protruding plate portions 173a protruding toward one side Z1 in the first direction Z are formed at predetermined distance along the second direction X. Note that, although not shown in the figure, the fourth wall part 174 is also formed with protruding plate portions in the same manner. A protruding plate portion 171a is formed to the first wall part 171, protruding to one side Z1 in the first direction Z from the center in the third direction Y of the outside edge. Note that, although not shown in the figure, the second wall part 172 is also formed with a protrusion plate portion in the same manner.

(Magnetic Drive Circuit)

Figure 4:
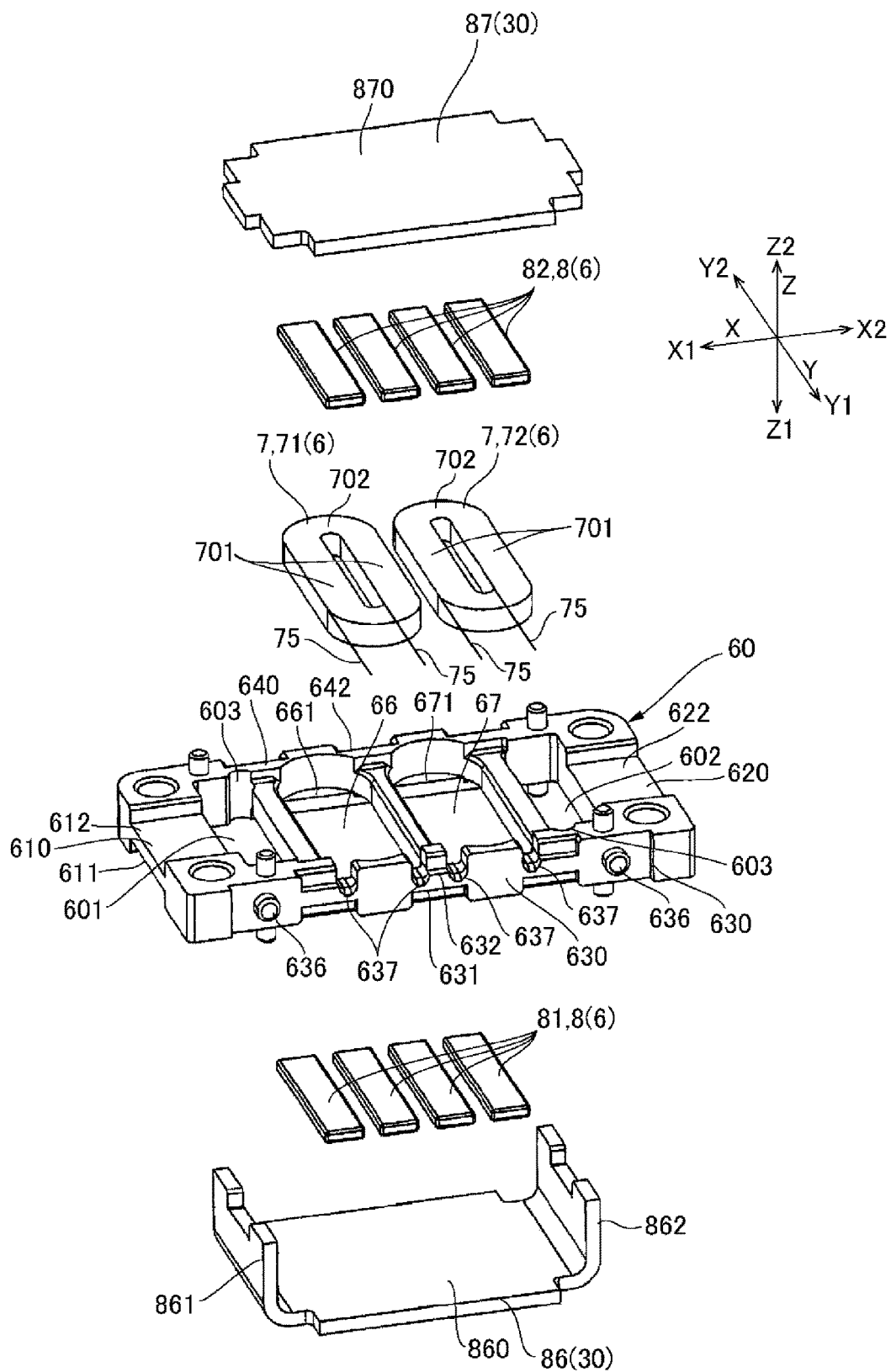
FIG. 4 is a perspective exploded view of a magnetic drive circuit, yokes and a holder of the actuator of Embodiment 1.

FIG. 4 is a perspective exploded view of a magnetic drive circuit 6, yoke 30 and the holder 60 of the actuator 1A of Embodiment 1. As shown in FIG. 2 and FIG. 4, the magnetic drive circuit 6 has coils 7 and magnets 8 which face the coil 7 in the first direction Z. The coils 7 consist of two coils 71 and 72 arranged side by side in the second direction X. The coil 7 is an oval-shaped air core coil having its longitudinal side 701 (the effective part) in the third direction Y and is also a flat coil having its thickness direction in the first direction Z. The coils 7 are held in the holder 60.

(Holder)

As shown in FIG. 2 and FIG. 4, the holder 60 is formed such that two coil retaining holes 66 and 67 are positioned side by side in the second direction X, and the coils 7 (the coils 71 and 72) are arranged in the coil retaining holes 66 and 67. The coil retaining holes 66 and 67 are through-holes, and receiving portions 661 and 671 are respectively formed at the end portions of the coil retaining holes 66 and 67 on one side Z1 in the first direction Z at both ends in the third direction Y. Therefore, when the coils 7 are mounted into the coil retaining holes 66 and 67 from the other side Z2 in the first direction Z, short sides 702 (ineffective parts) of the coils 7 are supported on one side Z1 in the first direction Z by the receiving parts 661 and 671. Under this condition, the coils 7 are bonded to the holder 60 by an adhesive, etc.

The holder 60 has a first wall 610 on one side X1 in the second direction X, a second wall part 620 on the other side X2 in the second direction X, a third wall part 630 on one side Y1 in the third direction Y, and a fourth wall part 640 on the other side Y2 in the third direction Y to surround the area in which the coil retaining holes 66 and 67 are formed. A first opening portion 601 is created between the coil retaining hole 66 and the first wall 610, and a second opening portion 602 is created between the coil retaining hole 67 and the second wall part 620. The first opening portion 601 and the second opening portion 602 pass through the holder 60 in the first direction Z.

In the first wall 610, a recess portion 611 is created on one side Z1 in the first direction Z and a recess portion 612 is created on the other side Z2 in the first direction Z. In the second wall part 620, a recess portion (not shown in the drawing) is created on one side Z1 in the first direction Z and a recess portion 622 is created on the other side Z2 in the first direction Z. In the outside surface of the third wall part 630, multiple recess portions 631 formed along the second direction X are arranged on one side Z1 in the first direction Z and other multiple recess portions 632 formed along the second direction X are arranged on the other side Z2 in the first direction Z. In the outside surface of the fourth wall part 640, multiple recess portions (not shown in the drawing) formed along the second direction X are arranged on one side Z1 in the first direction Z and other multiple recess portions 642 formed along the second direction X are arranged on the other side Z2 in the first direction Z.

In the outside surface of the third wall part 630, a recess portion 635 extending along the second direction X is formed, and a positioning protrusion 636 protruding toward one side Y1 in the third direction Y is formed at both end portions in the recess portion 635 in the second direction X. In the third wall part 630, four guide grooves 637 extend from the coil retaining holes 66 and 67 to the outside surface (the bottom surface of the recess portion 635) of the third wall part 630.

When the first cover member 16, the holder 60 and the second cover member 17 are fastened in the first direction Z to configure the support body 2, the protruding plate portions 163a of the first cover member 16 are fitted to the recess portions 631 of the holder 60, the protruding plate portions 164a of the first cover member 16 are fitted to the corresponding recess portions (not shown in the drawing) of the holder 60, and the protruding plate portions 161a and 162a of the first cover member 16 are fitted into the recess portions 611 and 621 of the holder 60. Also, the protruding plate portions 171a and 173a of the second cover member 17 are fitted to the recess portions 612 and 632 of the holder 60, the protruding plate portions (not shown in the drawing) of the second cover member 17 are fitted to the corresponding recess portions 622 and 642 of the holder 60. Therefore, the first cover member 16, the holder 60 and the second cover member 17 are mutually positioned and joined together. Also, the guide grooves 637 opens as holes 638 between the holder 60 and the second cover member 17.

The winding-start end and the winding-finish end of a lead wire 75, which composes the coil 7, are passed through the holes 638 between the holder 630 and the second cover member 17 and pulled outside the cover 11. Since a notch 150 which makes the holes 638 in an open state is created in the wiring board 15, the lead wire 75 pulled out from the holes 638 is passed through the notch 150 and soldered to a land 151 in the wiring board 15. Thus, the two coils 7 are electrically connected in series. Note that, the two coils 7 may be electrically connected in parallel.

(Movable Body)

As shown in FIG. 2 and FIG. 4, the movable body 3 is provided with magnets 8 and a yoke 30 for holding the magnets 8. The yoke 30 consists of a first yoke 86 having a first plate part 860 which faces the coils 7 from one side Z1 in the first direction Z and a second yoke 87 having a second plate part 870 which faces the coils 7 from the other side Z2 in the first direction Z; the magnets 8 are held to the surface of the first plate part 860 of the first yoke 86 facing the coils 7 and to the surface of the second plate part 870 of the second yoke 7 facing the coils 7, thus facing the coils 7 in the first direction Z. Note that, the magnets 8 may be held to only the first plate part 860 or the second plate part 870.

In Embodiment 1, the magnets 8 consists of magnets 81, which are fixed to the surface of the first plate part 860 of the first yoke 86 facing the coils 7 by a method of an adhesive, etc., and magnets 82, which are fixed to the surface of the second plate part 870 of the second yoke 87 facing the coils 7 by a method of an adhesive, etc. Under this condition, the magnets 81 face the longitudinal sides 701 of the coils 7 from one side Z1 in the first direction Z, and the magnet 82 face the longitudinal sides 701 of the coils 7 from the other side Z2 in the first direction Z. Each of the magnets 81 and 82 is polarized and magnetized in the thickness direction (the first direction Z) such that the surfaces of the magnets 81 facing the coils 7 are magnetized with a different polarity from the surfaces of the magnets 82 facing the coils 7. In this embodiment, the magnets 81 and the magnets 82 respectively consist of four magnet pieces which face the total four longitudinal sides 701 of the two coils 7 (the coil 71 and coil 72).

In Embodiment 1, the first yoke 86 is provided with a first joining plate 861, which extends from the first plate part 860 toward the other side Z2 in the first direction Z to the position at which it touches the second yoke 87 and is joined with the second yoke 87, and a second joining plate 862, which extends from the opposite side of the first plate part 860 from the first joining plate 861 toward the other side Z2 in the first direction Z to the position at which it overlaps with the second yoke 87 and is joined with the second yoke 87. The first joining plate 861 and the second joining plate 862 are joined with the end portions of the second yoke 87 by welding. The first joining plate 861 extends toward the other side Z2 in the first direction Z, passing through the first opening portion 601 in the holder 60 on one side X1 in the second direction X with respect to the coils 7; and the second joining plate 862 extends toward the other side Z2 in the first direction Z, passing through the second opening portion 602 in the holder 60 on the other side X2 in the second direction X with respect to the coils 7.

(Stopper)

As shown in FIG. 2 and FIG. 3, the inside surfaces of the first wall 161 of the first cover member 16, the first wall 610 of the holder 60 and the first wall part 171 of the second cover member 17 together configure a continuous plane (a first contacted portion 118) on one side X1 in the second direction X and face the first joining plate 861 of the first yoke 86, which is part of the movable body 3. Therefore, the first joining plate 861 contacts the first contacted portion 118 when the movable body 3 moves to one side X1 in the second direction X, and thus functions as a stopper for regulating the movable range of the movable body 3 toward one side X1 in the second direction X.

In the same manner, the inside surfaces of the second wall part 162 of the first cover member 16, the second wall portion 620 of the holder 60 and the second wall part 172 of the second cover member 17 together configure a continuous plane (a second contacted portion 119) on the other side X2 in the second direction X, and face the second joining plate 862. Therefore, the second joining plate 862 contacts the second contacted portion 119 when the movable body 3 moves to the other side X2 in the second direction X, and thus functions as a stopper for regulating the movable range of the movable body 3 toward the other side X2 in the second direction X.

(Viscoelastic Member)

As shown in FIG. 2, viscoelastic members 9 are arranged at positions at which the support body 2 and the movable body 3 face each other in the first direction Z. In Embodiment 1, the viscoelastic members 9 are made up with first viscoelastic members 91 arranged at positions at which the first yoke 86 of the movable body 3 and the first cover member 16 of the support body 2 face each other in the first direction Z and the second viscoelastic members 92 arranged at positions at which the second yoke 87 of the movable body 3 and the second cover member 17 of the support body 2 face each other in the first direction Z. More specifically described, the two first viscoelastic members 91 are arranged between the first plate part 860 of the first yoke 86 and the bottom portion of the recess portions 166 and 167 of the first cover member 16; and the two second viscoelastic member 92 are arranged between the second plate part 870 of the second yoke 87 and the bottom portion (the indented surface) of the recess portions 176 and 177 of the second cover member 17.

The first viscoelastic members 91 and the second viscoelastic members 92 are arranged having the thickness direction thereof in the first direction Z and extend in the second direction X and the third direction Y. Here, the first viscoelastic members 91 are compressed in the first direction Z between the first plate part 860 of the first yoke 86 and the bottom portion of the recess portions 166 and 167 of the first cover member 16; and the second viscoelastic members 92 are compressed in the first direction Z between the second plate part 870 of the second yoke 87 and the bottom portion (the indented surface) of the recess portions 176 and 177 of the second cover member 17. The first viscoelastic members 91 and the second viscoelastic members 92 are bonded to the support body 2 with the surface thereof which makes contact with the support body 2 and bonded to the movable body 3 with the surface thereof which makes contact with the movable body 3.

As shown in FIG. 3, the recess portions 166 and 167 of the first cover member 16 are indented one floor from the bottom surface 165a of the recess 165; therefore, the bottom surface 165a of the recess 165 protrudes toward the other side Z2 in the first direction Z further from the bottom surface of the recess portions 166 and 167, to which the first viscoelastic members 91 are connected (bonded), and faces the first plate part 860 of the first yoke 86. For this reason, the bottom surface 165a of the recess 165 hits the first plate part 860 in the first direction Z to regulate compression collapse of the first viscoelastic members 91 in the first direction Z. In the same manner, the recess portions 176 and 177 of the second cover member 17 are indented one floor from the indented surface 175a of the recess 175; therefore, the indented surface 175a protrudes toward one side Z1 in the first direction Z further from the surface of the recess portions 176 and 177, to which the second viscoelastic members 92 are connected (bonded), and faces the second plate part 870 of the second yoke 87. Therefore, the indented surface 175a of the recess 175 hits the second plate part 870 in the first direction Z to regulate compression collapse of the second viscoelastic members 92 in the first direction Z.

(Major Effects of Embodiment 1)

As described above, the actuator 1A of Embodiment 1 is configured such that the viscoelastic members 9 are arranged in the position at which the support body 2 and the movable body 3 face each other in the first direction Z and the magnetic drive circuit 6 drives the movable body 3 in the second direction X which crosses with the first direction Z. Also, the viscoelastic members 9 are arranged having the thickness direction thereof in the first direction Z between the movable body 3 and the support body 2; when the movable body 3 moves relative to the support body 2 in the second direction X, the viscoelastic members 9 deform in the direction (the shearing direction) which crosses with the thickness direction (the axial direction). Therefore, resonance caused when the movable body 3 is vibrated can be restrained by the viscoelastic members 9. Also, the deformation of the viscoelastic member 9 in the shearing direction happens in the direction in which the viscoelastic member 9 is pulled and stretched; therefore, the viscoelastic member 9 exhibits the characteristics in which a linear component (a spring coefficient) is larger than a nonlinear component (a spring coefficient). Thus, the viscoelastic member 9 demonstrates consistent spring force in any direction of motion. For this reason, in Embodiment 1, since the spring element of the viscoelastic member 9 in the shearing direction is utilized to improve reproducibility of vibration acceleration corresponding to the input signals, vibrations can be actualized with delicate nuances.

The viscoelastic members 9 are attached so as to stretch in the first direction Z between the movable body 3 and the support body 2; when pressed and compressively deformed in the thickness direction (the axial direction) between the movable body 3 and the support body 2, the viscoelastic member 9 exhibits the characteristics in which a nonlinear component (a spring coefficient) is larger than a linear component (a spring coefficient). Therefore, the viscoelastic members 9 can be restrained from greatly deforming in the direction perpendicularly intersecting with the driving direction of the movable body 3, thus preventing the gap between the movable body 3 and the support body 2 from greatly varying.

In Embodiment 1, a flat coil having its thickness direction in the first direction Z is used for the coil 7, and a flat plate-like magnet having its thickness direction in the first direction Z is used for the magnet 8. Therefore, the magnets 8 and the coils 7 together configure the flat magnetic drive circuit 6 having its thickness direction in the first direction Z; therefore, the actuator 1A is made thinner in the direction (the first direction) perpendicularly intersecting with the driving direction (the second direction X). Accordingly, a small actuator 1A that generates vibration in one axial direction (second direction) can be configured. Note that, in Embodiment 1, two coils 7 are arranged in one layer; however, the coils 7 can be arranged in multiple layers so that each of the coils 7 is opposed to each of the magnets 8 to ensure stronger driving force.

More specifically described, the movable body 3 of Embodiment 1 is provided with the yoke 30 which holds the magnets 8 and has the first plate part 860 extending in the second direction X; the support body 2 is provided with the first cover member 16 which faces the first plate part 860 in the first direction Z and extends in the second direction X; and the first viscoelastic members 91 are arranged between the first plate part 860 and the first cover member 16. Also, the yoke 30 is provided with the second plate part 870 extending in the second direction X; the support body 2 is provided with the second cover member 17 which faces the second plate part 870 in the first direction Z and extends in the second direction X; the second viscoelastic members 92 are arranged between the second plate part 870 and the second cover member 17. With this configuration, the viscoelastic members 9 can be arranged so as to deform in the shearing direction when the movable body 3 is vibrated in the second direction.

The support body 2 of Embodiment 1 is provided with the holder 60 for holding the coils 7 (the coils 71 and 72), and the first plate part 860 and the second plate part 870 of the yoke 30 are positioned at both ends of the holder 60 in the first direction Z. The yoke 30 has the first joining plate 861 and the second joining plate 862 which are bent toward the second plate part 870 at both ends of the first plate part 860 and welded to the second plate part 870. Therefore, a magnetic efficiency can be improved by the yoke 30, ensuring the driving force of the actuator 1A. The first joining plate 861 and the second joining plate 862 of the yoke 30 abut on the support body 2 to configure the stopper for regulating the moving range of the movable body 3 in the second direction X. Thus, impact resistance of the actuator 1A can be increased.

Note that, the viscoelastic members 9 is disposed between the support body 2 and the movable body 3, and the viscoelastic members 9 may be arranged not between the cover 11 and the movable body 3, but between the holder 60 and the movable body 3. For example, the viscoelastic members 9 can be arranged at the positions at which the first plate part 860 of the yoke 30 and the holder 60 face each other and at the position at which the second plate part 870 of the yoke 30 and the holder 60 face each other. In this case, there is no need to obtain a gap between the cover 11 and the movable body 3 for arranging the viscoelastic members 9 therein; therefore, the actuator can be advantageously made thinner. Also, the viscoelastic members 9 can be mounted between the holder 60 and the movable body 3 before attaching the cover 11; therefore, the vibration characteristics including a damper performance can be inspected before the cover 11 is attached.

The support body 2 of Embodiment 1 is configured such that the first cover member 16, the holder 60 and the second cover member 17 are fastened in the first direction Z by screws 18 having the screw shaft extending in the first direction Z. For this reason, the gap at the place where the support body 2 and the movable body 3 face each other easily varies. However, because the viscoelastic members 9 of Embodiment 1 are arranged between the support body 2 and the movable body 3 while compressed in the first direction Z, the viscoelastic member 9 responds to the movement of the movable body 3 with certainty. Therefore, resonance of the movable body 3 can be effectively prevented. Also, the viscoelastic members 9 can be compressed in the first direction Z at the time of fastening the first cover member 16, the holder 60, and the second cover member 17 together with the screws 18.

The support body 2 of Embodiment 1 is configured such that the portion thereof contacting the first viscoelastic members 91 is the recess 165 in the first cover member 16 and the portion thereof contacting the second viscoelastic members 92 is the recess 175 in the second cover member 17. Therefore, the positions of the first viscoelastic members 91 and the second viscoelastic members 92 hardly shift, and thus, the viscoelastic members 91 and 92 can easily be positioned. The support body 2 restricts compression collapse of the first viscoelastic members 91 in the first direction Z with the bottom surface 165*a* of the recess 165 in the first cover member 16. In the same manner, the support body 2 restricts compression collapse of the second viscoelastic members 92 in the first direction Z with the dented surface 175*a* of the recess 175 in the second cover member 17.

Embodiment 2

Figure 5:
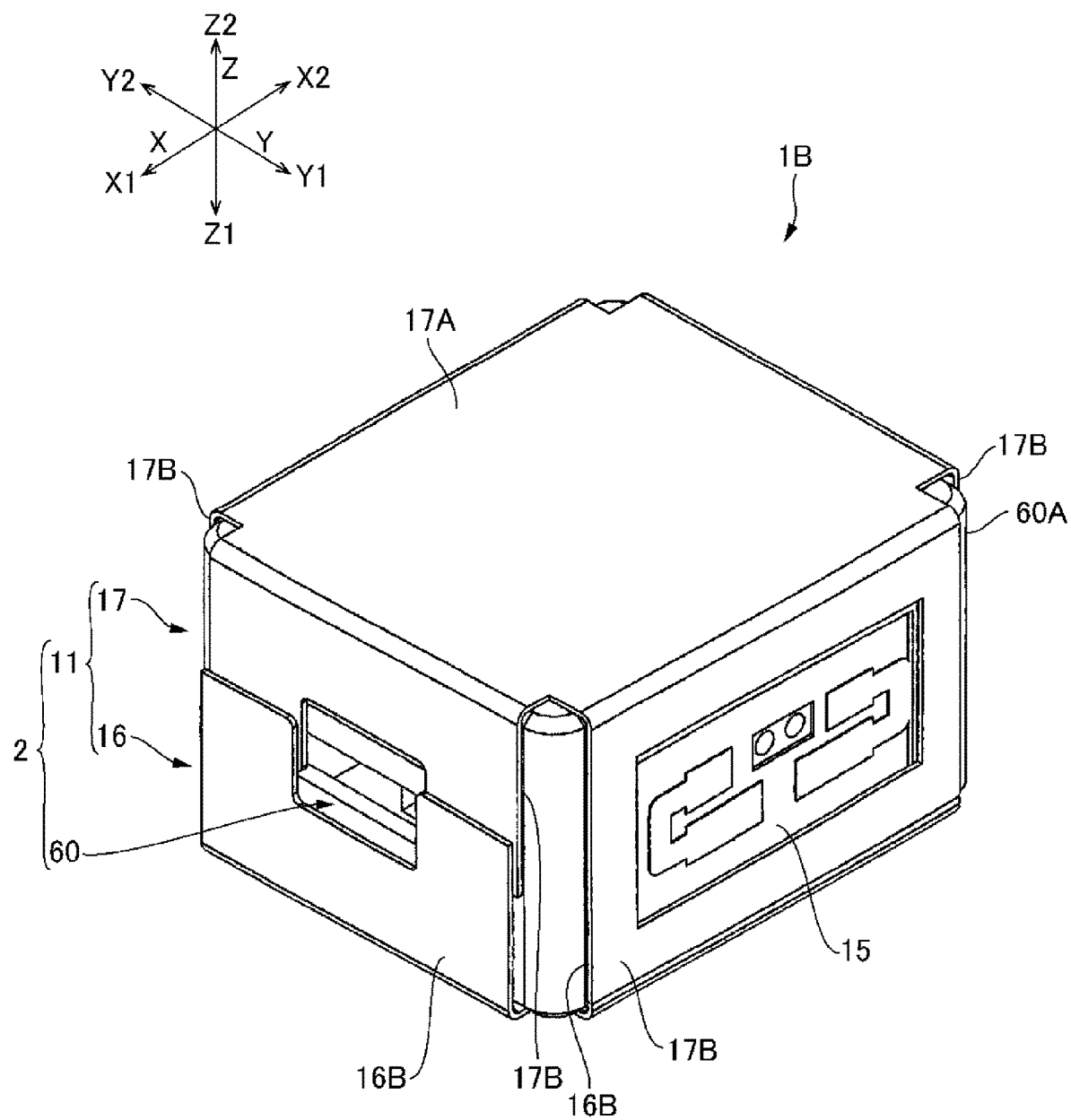
FIG. 5 is a perspective view of an actuator of Embodiment 2 of the present invention.
Figure 6:
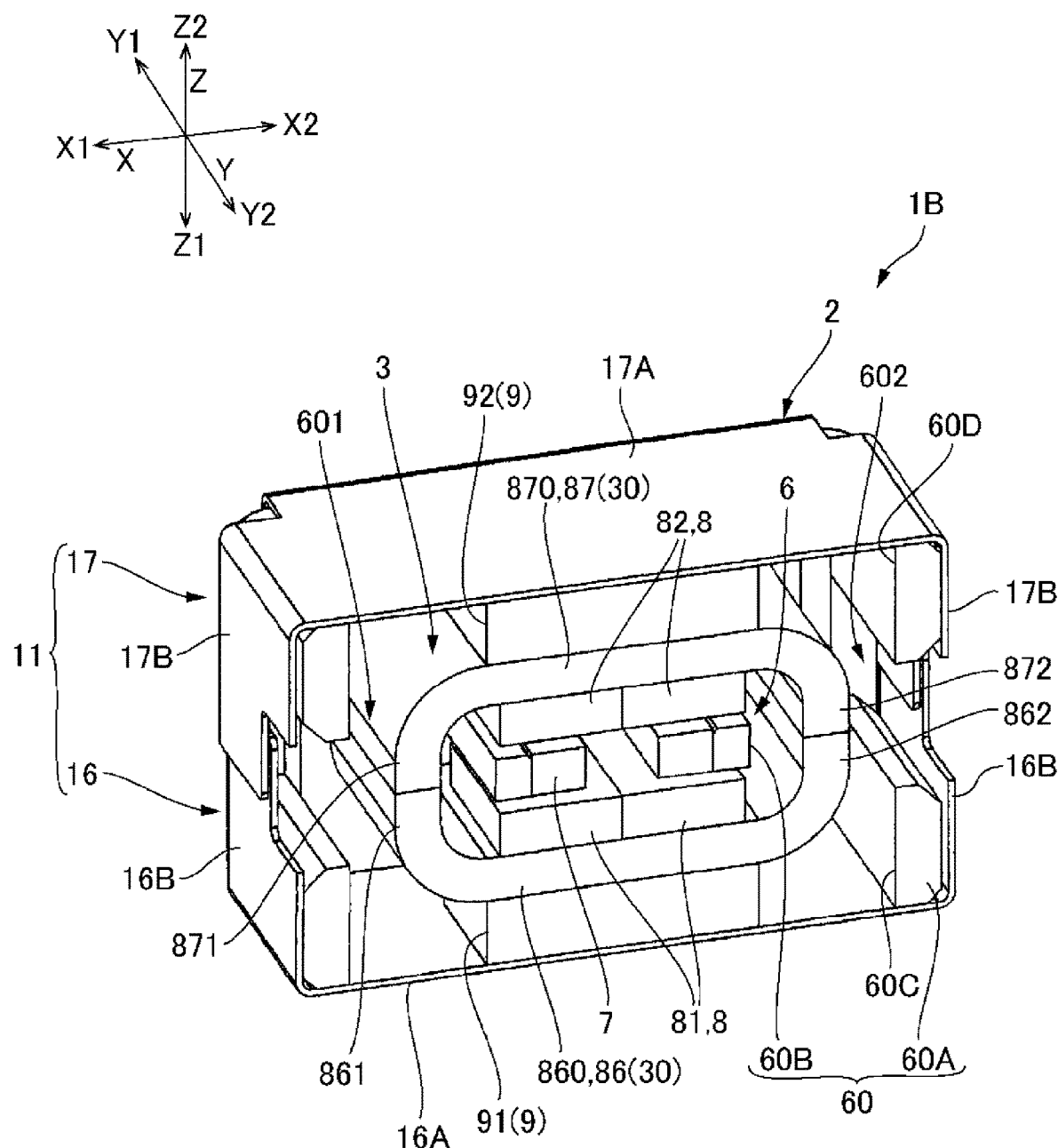
FIG. 6 is an XZ cross-sectional view of the actuator of Embodiment 2.
Figure 7:
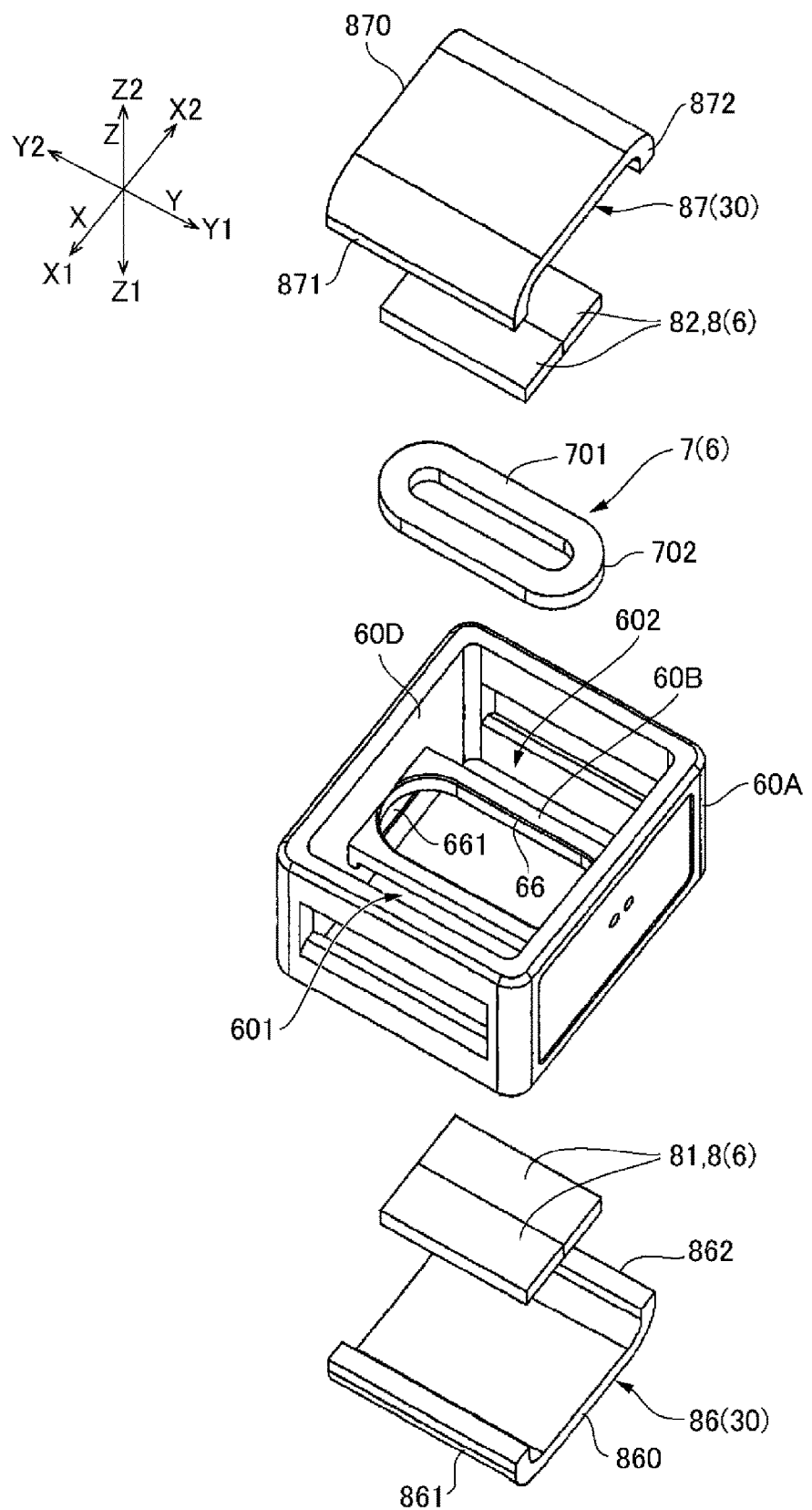
FIG. 7 is a perspective exploded view of the actuator of Embodiment 2, having a cover removed.

FIG. 5 is a perspective view of an actuator 1B of Embodiment 2 of the present invention. FIG. 6 is an XZ cross-sectional view of the actuator 1B of Embodiment 2. FIG. 7 is a perspective exploded view of the actuator 1B of Embodiment 2 with the cover 11 removed. As shown in FIG. 5, the actuator 1B of Embodiment 2 vibrates the movable body 3 in the second direction X with the magnetic drive circuit 6.

(Support Body)

FIG. 6 shows the actuator 1B of Embodiment 2 in which the support body 2 has the cover 11 and the holder 60 in which the movable body 3 and the magnetic drive circuit 6 are arranged. The cover 11 is provided with the first cover member 16 positioned on one side Z1 in the first direction Z and the second cover member 17 laid on the first cover member 16 from the other side Z2 in the first direction Z. As shown in FIG. 7, the holder 60 has a tubular part 60A, which opens to both ends in the first direction Z and has a quadrangle cross section, and a coil holding portion 60B arranged inside the tubular part 60A. The tubular part 60A has a first opening 60C which opens to one side Z1 in the first direction Z and a second opening 60D which opens to the other side Z2 in the first direction Z. The wiring board 15 is mounted to the side surface on one side Y1 in the third direction Y of the tubular part 60A.

The first cover member 16 covers the holder 60 from one side Z1 in the first direction Z. The first cover member 16 has a first end plate 16A which contacts the tubular part 60A from one side Z1 in the first direction Z and four first side plates 16B which respectively rise to the other side Z2 in the first direction Z from the edges at both ends of the first end plate 16A in the second direction X and at both ends of the first end plate 16A in the third direction Y. Also, the second cover member 17 covers the holder 60 from the other side Z2 in the first direction Z. The second cover member 17 has a second end plate 17A which contacts the tubular part 60A from the other side Z2 in the first direction Z and four second side plates 17B which respectively rise to one side Z1 in the first direction Z from the edges at both ends of the second end plate 17A in the second direction X and at both ends of the second end plate 17A in the third direction Y. The first cover member 16 and the second cover member 17 are bonded together such that the four first side plates 16B at least partially overlap the second side plates 17B. As shown in FIG. 5, quadrangle openings are created at positions in the first side plate 16B and the second side plate 17B covering the surface of the holder on one side Y1 in the third direction Y, at which the wiring board 15 is attached.

The coil holding portion 60B extends in the third direction Y at the center of the tubular part 60A in the first direction Z; one end and the other end of the coil holding portion 60B in the third direction Y are connected to the inside surface of the tubular part 60A. In the coil holding portion 60B is formed a coil retaining hole 66; at the end portion of the coil retaining hole 66 on one side Z1 in the first direction Z is formed a receiving portion 661. The holder 60 is also provided with a first opening portion 601 on one side X1 in the second direction X of the coil holding portion 60B and a second opening portion 602 on the other side X2.

(Magnetic Drive Circuit)

As shown in FIG. 6 and FIG. 7, the magnetic drive circuit 6 has the coil 7 and the magnets 8 which face the coil 7 in the first direction Z. In the same manner as Embodiment 1, the coil 7 is an elliptical air core coil having its longitudinal sides 701 (the effective part) in the third direction Y and also a flat coil having its thickness direction in the first direction Z. The coil 7 is mounted to the coil retaining hole 66 from the other side Z1 in the first direction Z, and the short sides 702 (the ineffective part) of the coil 7 are supported on one side Z1 in the first direction Z by the receiving part 661. Under this condition, the coil 7 is fixed to the coil holding portion 60B by an adhesive, etc.

(Movable Body)

As shown in FIG. 6 and FIG. 7, the movable body 3 is provided with the magnets 8 and the yoke 30 for holding the magnets 8. The yoke 30 consists of the first yoke 86 which has the first plate part 860 facing the coil 7 from one side Z1 in the first direction Z and the second yoke 87 which has the second plate part 870 facing the coil 7 from the other side Z2 in the first direction Z. The magnets 8 consist of the magnet 81 fixed on the surface of the first plate part 860 facing the coil 7 by a method such as an adhesive and the magnet 82 fixed to the surface of the second plate part 870 facing the coil 7 by a method such as an adhesive; the magnet 81 and the magnet 82 are opposed to the coil 7 in the first direction Z. Note that, either the magnet 81 or 82 can be omitted.

The first yoke 86 and the second yoke 87 are formed symmetric to each other in the first direction Z. The first yoke 86 has the first joining plate part 861, which extends from the first plate part 860 toward the other side Z2 in the first direction Z to the position contacting the second yoke 87, and the second joining plate part 862, which is on the other side of the magnet 81 from the first joining plate part 861 and extends from the first plate part 860 toward the other side Z2 in the first direction Z. In the same manner, the second yoke 87 has a third joining plate part 871 and a fourth joining plate part 872; the third joining plate part 871 is joined to the first joining plate part 861 by welding and the fourth joining plate part 872 is joined to the second joining plate part 862 by welding. The first joining plate part 861 and the third joining plate part 872 extend in the first direction Z, passing through the first opening portion 601 in the holder 60 on one side X1 in the second direction X of the coil 7; the second coupling plate part 862 and the fourth coupling plate part 872 extend in the first direction Z, passing through the second opening portion 602 in the holder 60 on the other side X2 in the second direction X of the coil 7.

(Viscoelastic Member)

As shown in FIG. 6, the viscoelastic members 9 are arranged at positions at which the support body 2 and the movable body 3 face each other in the first direction Z. In Embodiment 2, the viscoelastic members 9 consist of the first viscoelastic member 91, which is arranged at a position at which the first yoke 86 of the movable body 3 and the first cover member 16 of the support body 2 face each other in the first direction Z, and the second viscoelastic member 92, which is arranged at a position at which the second yoke 87 of the movable body 3 and the second cover member 17 of the support body 2 face each other in the first direction Z. More specifically described, the first viscoelastic member 91 is arranged between the first plate part 860 of the first yoke 86 and the first end plate part 16A of the first cover member 16; the second viscoelastic member 92 is arranged between the second plate part 870 of the second yoke 87 and the second end plate part 17A of the second cover member 17.

The first viscoelastic member 91 and the second viscoelastic member 92 are arranged having the thickness direction thereof in the first direction Z in the same manner as Embodiment 1. The first viscoelastic member 91 is arranged between the first plate part 860 of the first yoke 86 and the first end plate part 16A of the first cover member 16 while compressed in the first direction Z; the second viscoelastic member 92 is arranged between the second plate part 870 of the second yoke 87 and the second end plate part 17A of the second cover member 17 while compressed in the first direction Z.

(Major Effects of Embodiment 2)

As described above, in the actuator 1B of Embodiment 2, the viscoelastic members 9 are arranged at the positions at which the support body 2 and the movable body 3 face each other in the first direction Z, and the magnetic drive circuit 6 drives the movable body 3 in the second direction X which crosses the first direction Z. The viscoelastic members 9 are arranged having the thickness direction thereof in the first direction Z between the movable body 3 and the support body 2; when the movable body 3 moves in the second direction X relative to the support body 2, the viscoelastic members 9 are deformed in the shearing direction. Therefore, in the same manner as Embodiment 1, resonance caused when the movable body 3 is vibrated can be restrained. Also, reproducibility of vibration acceleration corresponding to the input signals can be improved by utilizing the spring element of the viscoelastic members 9 in the shearing direction; therefore, vibrations can be actualized with delicate nuances. Further, when the viscoelastic members 9 are pressed and compressively deformed in the thickness direction thereof (the axial direction) between the movable body 3 and the support body 2, the viscoelastic member 9 can be restrained from greatly deforming; therefore, the gap between the movable body 3 and the support body 2 can be prevented from greatly varying.

Embodiment 3

Figure 8:
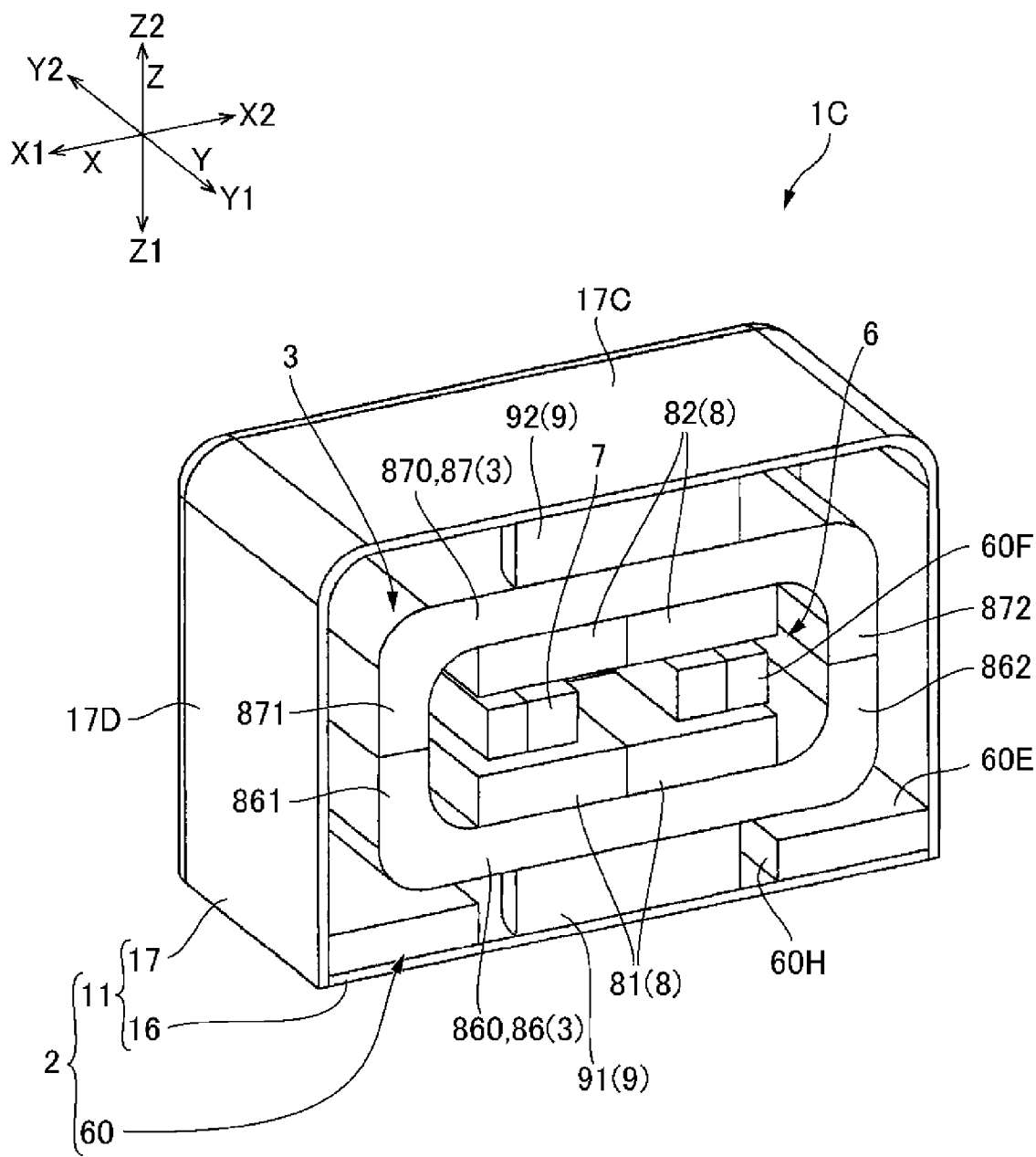
FIG. 8 is an XZ cross-sectional view of the actuator of Embodiment 3.
Figure 9:
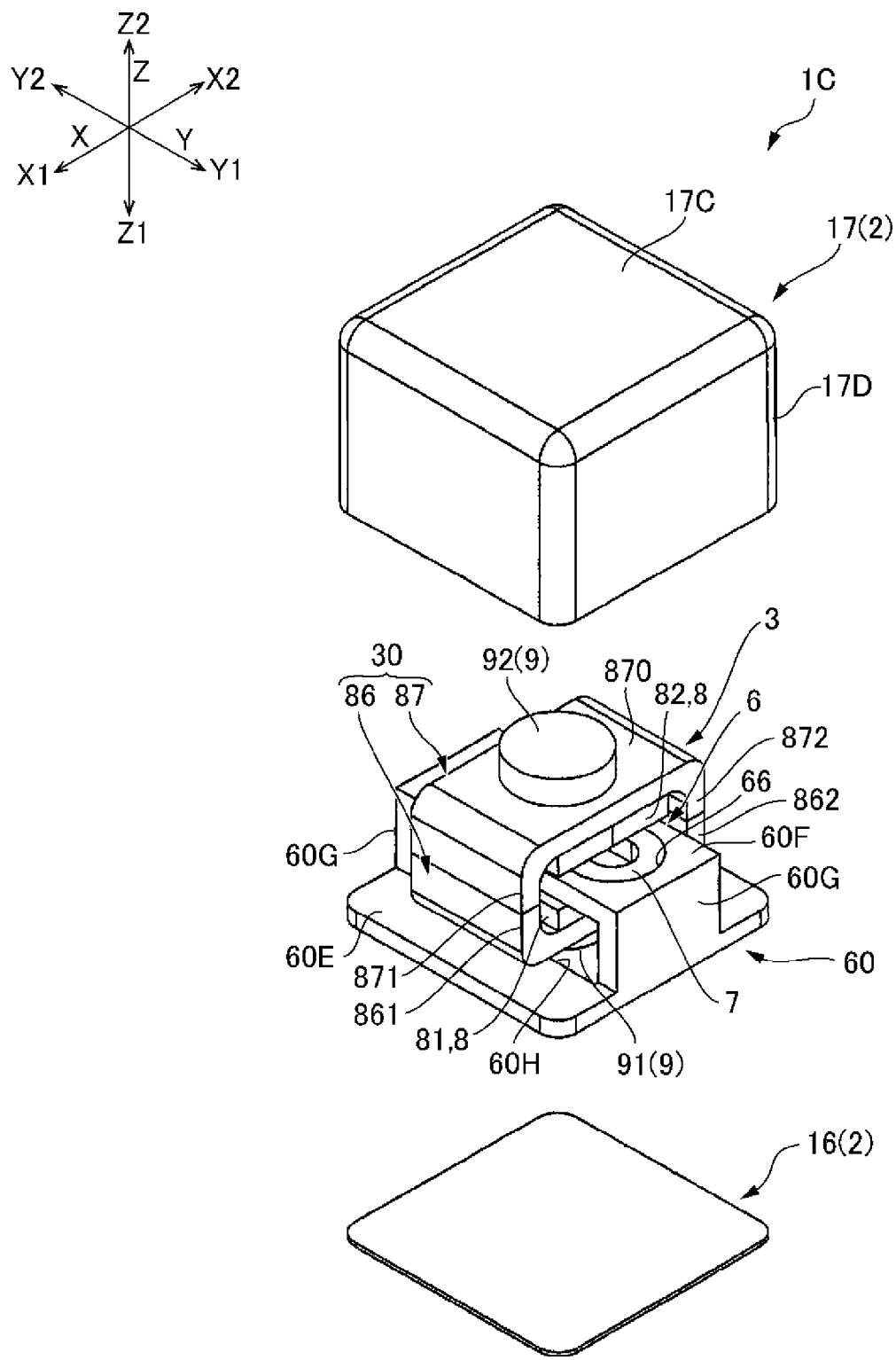
FIG. 9 is a perspective exploded view of the actuator of Embodiment 3.
Figure 10:
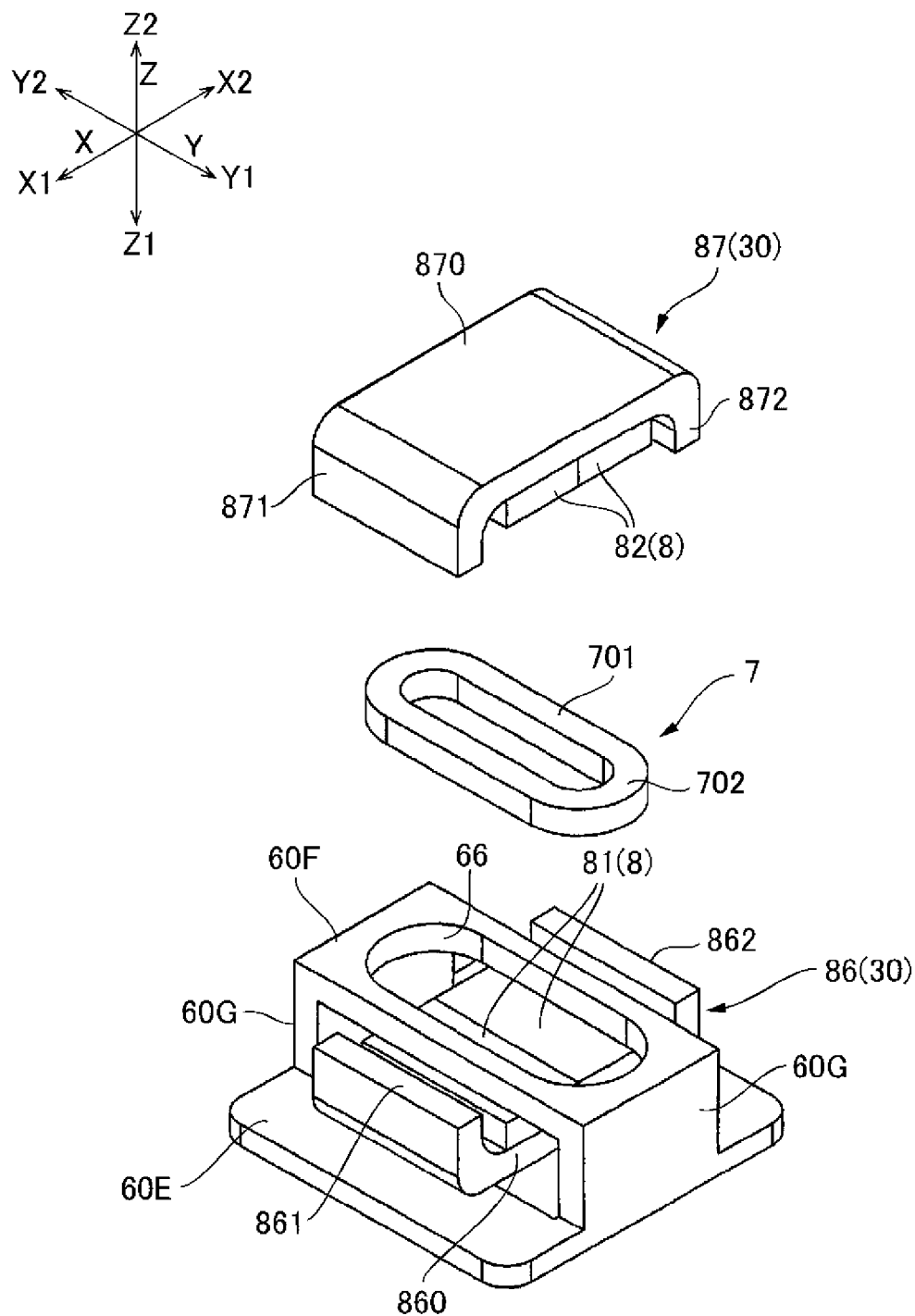
FIG. 10 is a perspective exploded view of the magnetic drive circuit, a yoke and a holder of the actuator of Embodiment 3.

FIG. 8 shows an XZ cross-sectional view of an actuator 1C of Embodiment 3 of the present invention. FIG. 9 shows a perspective exploded view of the actuator 1C of Embodiment 3. FIG. 10 is a perspective exploded view of the magnetic drive circuit 6, the yoke 30 and the holder 60 of the actuator 1C of Embodiment 3. The actuator 1C of Embodiment 3 vibrates the movable body 3 in the second direction X with the magnetic drive circuit 6.

(Support Body)

In the actuator 1C of Embodiment 3 as shown in FIG. 8 and FIG. 9, a support body 2 has a cover 11 and a holder 60, and a movable body 3 and a magnetic drive circuit 6 are arranged inside the cover 11. The cover 11 has a first cover member 16 positioned on one side Z1 in the first direction Z and a second cover member 17 laid on the first cover member 16 from the other side Z2 in the first direction Z. As shown in FIG. 9, the holder 60 has a rectangular bottom plate 60E, a coil holding portion 60F extending in the third direction Y on the other side Z2 of the bottom plate 60E in the first direction Z, and side plates 60G connecting the coil holding portion 60F with the bottom plate 60E. The side plates 60G rise from the center of the edges at both ends of the bottom plate 60E in the third direction Y toward the other side Z2 in the first direction Z and connected to both edges of the coil holding portion 60F in the third direction Y. The bottom plate 60E has an opening 60H created in an area thereof overlapping with the coil holding portion 60F in the first direction Z. The opening 60H passes through the bottom plate 60E in the first direction Z. As shown in FIG. 10, a coil retaining hole 66 is created in the coil holding portion 60F. Note that, although not shown in the figure, a receiving portion may be formed at the edge of the coil retaining hole 66 on one side Z1 in the first direction Z.

The first cover member 16 is in a rectangular shape and contacts the bottom plate 60E of the holder 60 from one side Z1 in the first direction Z. The second cover member 17 covers the holder 60 from the other side Z2 in the first direction Z. The second cover member 17 has a rectangular end plate 17C and a tubular portion 17D which extends from the outside periphery of the end plate 17C toward one side Z1 in the first direction Z. The bottom plate 60E of the holder 60 and the first cover member 16 are fitted into the inside of the tip end of the tubular portion 17D on one side Z1 in the first direction Z.

(Magnetic Drive Circuit)

As shown in FIG. 9, the magnetic drive circuit 6 has a coil 7 and magnets 8 which face the coil 7 in the first direction Z. As shown in FIG. 10, the coil 7 is an elongated air core coil with its longitudinal sides 701 (the effective part) extending in the third direction Y. The coil 7 is mounted into the coil retaining hole 66 from the other side Z2 in the first direction Z and fixed to the coil holding portion 60F by an adhesive.

(Movable Body)

As shown in FIG. 9 and FIG. 10, the movable body 3 has the magnets 8 and the yoke 30 which holds the magnets 8 therein. The yoke 30 consists of a first yoke 86 which has a first plate part 860 facing the coil 7 from one side Z1 in the first direction Z and a second yoke 87 which has a second plate part 870 facing the coil 7 from the other side Z2 in the first direction Z. The magnets 8 consist of magnets 81 fixed on the surface of the first plate part 860 of the first yoke 86 facing the coil 7 by a method of an adhesive and magnets 82 fixed on the surface of the second plate part 870 of the second yoke 87 facing the coil 7 by a method such as an adhesive; the magnets 81 and the magnets 82 face the coil 7 in the first direction Z. The same configuration as Embodiment 2 is used for the magnets 8 and the yoke 30; therefore, the same reference numerals are given to the same portions and the description thereof is omitted. As shown in FIG. 8, a first joining plate 861 and a third joining plate 871 of the yoke 30 of Embodiment 3 extend in the first direction Z passing between the tubular portion 17D and the coil holding portion 60F on one side X1 in the second direction X with respect to the coil 7; the second joining plate 862 and the fourth coupling plate 872 extend in the first direction Z passing between the tubular portion 17D and the coil holding portion 60F on the other side X2 in the second direction X of the coil 7.

(Viscoelastic Member)

As shown in FIG. 8, viscoelastic members 9 are arranged at positions at which the support body 2 and the movable body 3 face each other in the first direction Z. In this embodiment, the viscoelastic members 9 consist of a first viscoelastic member 91, which is arranged at the position at which the first yoke 86 of the movable body 3 and the first cover member 16 of the support body 2 face each other in the first direction Z, and the second viscoelastic member 92, which is arranged at the position at which the second yoke 87 of the movable body 3 and the second cover member 17 of the support body 2 face each other in the first direction Z. More specifically described, the first viscoelastic member 91 is made to pass through the opening 60H of the holder 60 and arranged between the first plate part 860 of the first yoke 86 and the first cover member 16; the second viscoelastic member 92 is arranged between the second plate part 870 of the second yoke 87 and the second end plate 17C of the second cover member 17.

In the same manner as Embodiment 1 or 2, the first viscoelastic member 91 and the second viscoelastic member 92 have the thickness direction thereof in the first direction Z and extend as a flat plate in the direction perpendicularly intersecting with the first direction Z. Note that, while the first viscoelastic member 91 and the second viscoelastic member 92 of Embodiment 1 or 2 are in the rectangular shape when viewed in the first direction Z, the viscoelastic members 91 and 92 of Embodiment 3 are in a circular shape when viewed in the first direction Z. Also, the first viscoelastic member 91 is arranged between the first plate part 860 of the first yoke 86 and the first cover member 16 while compressed in the first direction Z; the second viscoelastic member 92 is arranged between the second plate part 870 of the second yoke 87 and the end plate 17C of the second cover member 17 while compressed in the first direction Z.

(Major Effects of Embodiment 3)

As described above, in the actuator 1C of Embodiment 3, the viscoelastic members 9 are arranged at the positions at which the support body 2 and the movable body 3 face each other in the first direction Z, and the magnetic drive circuit 6 drives the movable body 3 in the second direction X which crosses the first direction Z in the same manner as Embodiment 1 or 2. The viscoelastic members 9 are arranged between the movable body 3 and the support body 2 having the thickness direction thereof in the first direction Z; when the movable body 3 is moved in the second direction X relative to the support body 2, the viscoelastic members 9 are deformed in the shearing direction. Therefore, the viscoelastic members 9 deform in the direction (the shearing direction) crossing the thickness direction (the axial direction). Therefore, in the same manner as Embodiment 1 or 2, resonance caused when the movable body 3 is vibrated can be restrained. Also, reproducibility of vibration acceleration corresponding to the input signals can be improved by utilizing the spring element of the viscoelastic members 9 in the shearing direction; therefore, vibrations can be actualized with delicate nuances. Further, when the viscoelastic members 9 are pressed and compressively deformed in the thickness direction thereof (the axial direction) between the movable body 3 and the support body 2, the viscoelastic members 9 can be restrained from greatly deforming; therefore, the gap between the movable body 3 and the support body 2 can be prevented from greatly varying.

Embodiment 4

Figure 11:
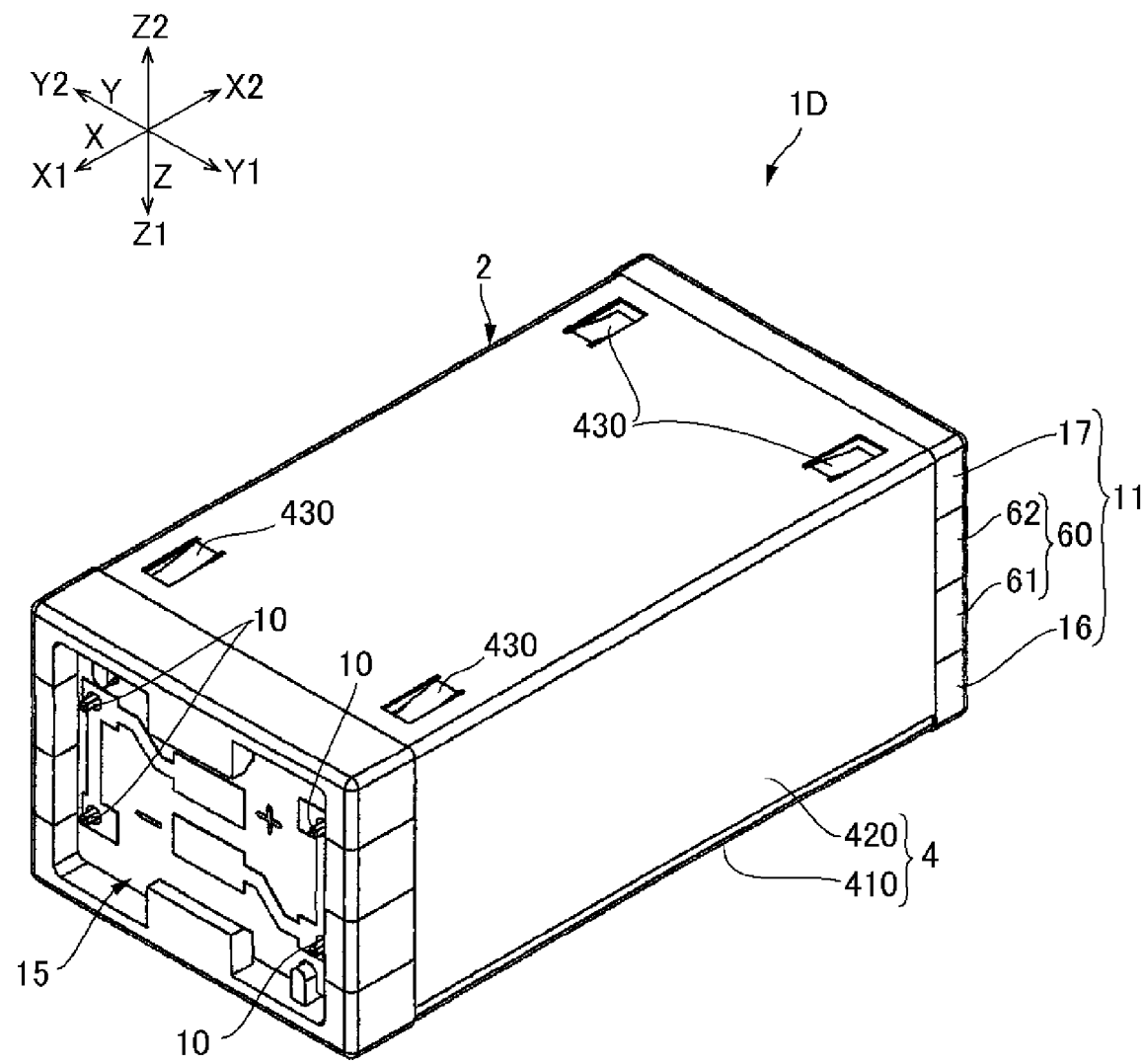
FIG. 11 is a perspective view of an actuator of Embodiment 4 of the present invention.
Figure 12:
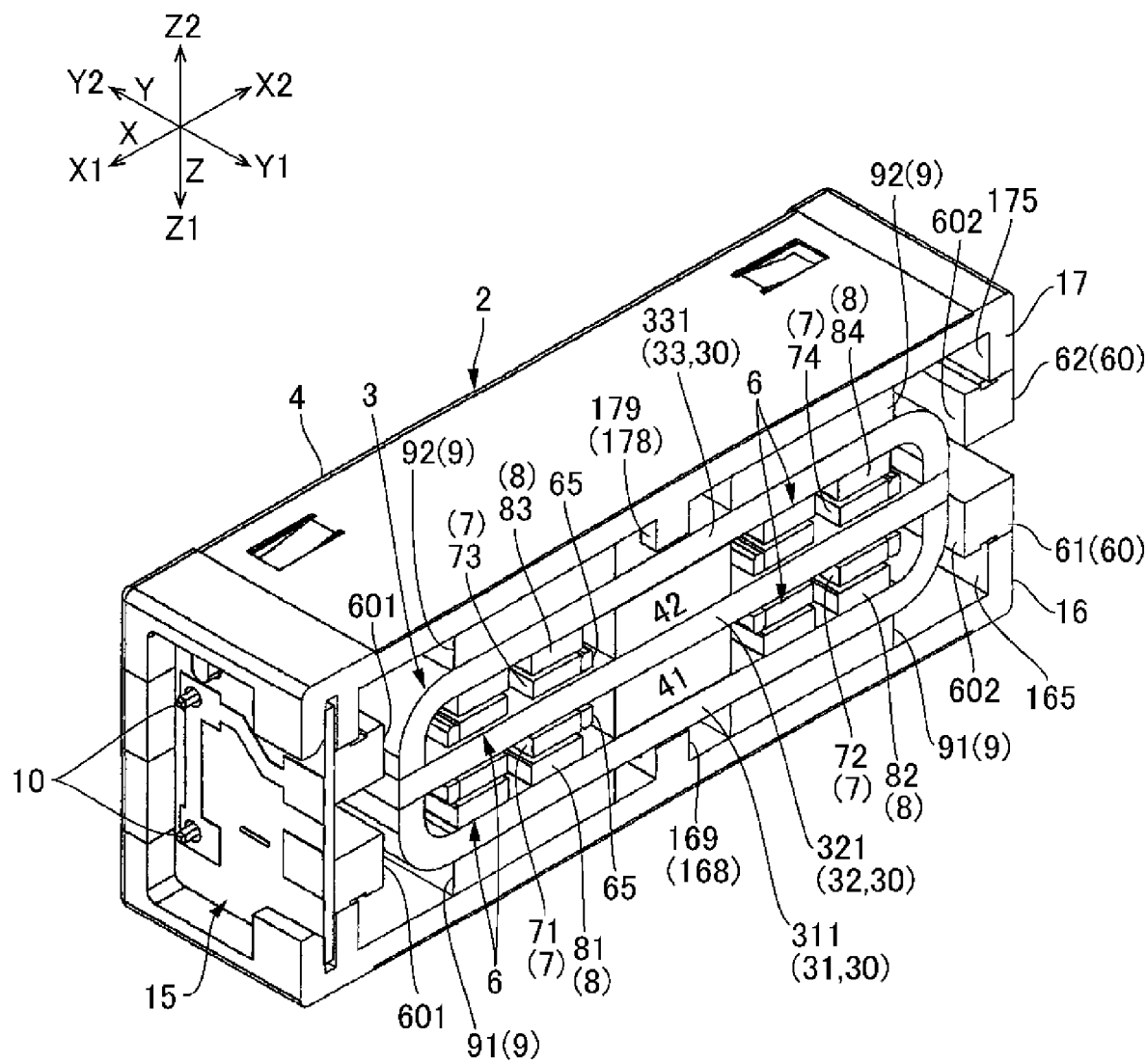
FIG. 12 is an XZ cross-sectional view of the actuator of Embodiment 4.
Figure 13:
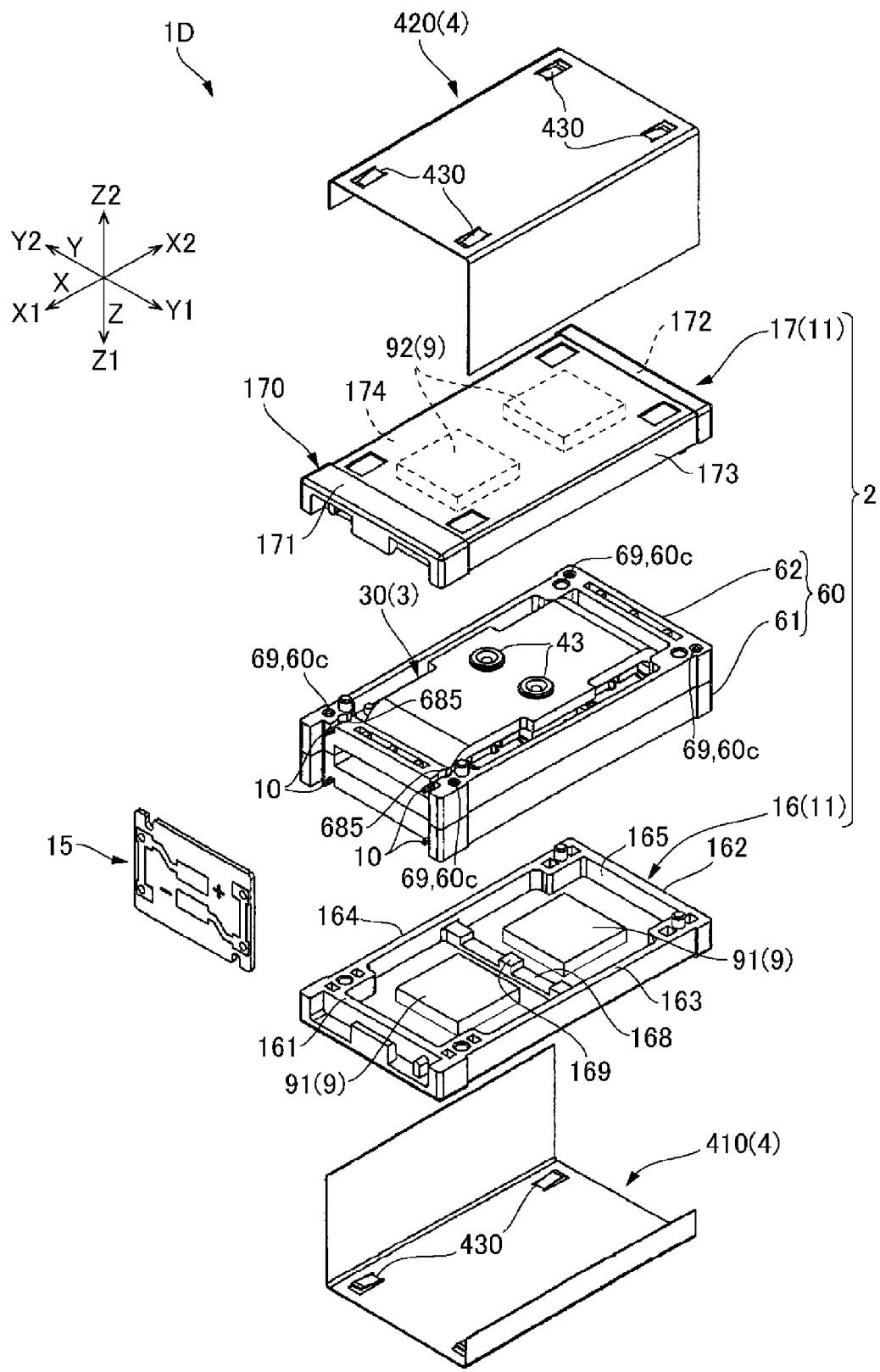
FIG. 13 is a perspective exploded view of the actuator of Embodiment 4.

FIG. 11 is a perspective view of an actuator 1D of Embodiment 4 of the present invention. FIG. 12 is an XZ cross-sectional view of the actuator 1D of Embodiment 4. FIG. 13 is a perspective exploded view of the actuator 1D of Embodiment 4. The actuator 1D of Embodiment 4 vibrates the movable body 3 in the second direction X with the magnetic drive circuit 6.

(Support Body)

In an actuator 1D of Embodiment 4 as shown in FIG. 11 and FIG. 12, a support body 2 is provided with an angled tubular case 4, a cover 11 held inside the tubular case 4, and a holder 60; a movable body 3 and a magnetic drive circuit 6 are arranged inside the cover 11. The cover 11 has a first cover member 16 positioned on one side Z1 in the first direction Z and a second cover member 17 laid on the first cover member 16 from the other side Z2 in the first direction Z. As shown in FIG. 13, the tubular case 4 is configured by two members, a first case 410 and a second case 420, and bonded together in the tubular shape. In the tubular case 4 are provided sheet springs 430; the first cover member 16 and the second cover member 17 each have rectangular recesses created at positions which align with the sheet springs 430 in the first direction Z. A wiring board 15 is mounted to the side surface of the support body 2 on one side X1 in the second direction X. Because the tubular case 4 is used, the cover 11 can be constructed without using an adhesive and screws are not needed, either.

As shown in FIG. 12 and FIG. 13, a recess 165 which opens to the other side Z2 in the first direction Z is created in the first cover member 16. In the first cover member 6, the recess 165 is surrounded by a first wall part 161 positioned on one side X1 in the second direction X, a second wall part 162 positioned on the other side X2 in the second direction X, a third wall part 163 positioned on one side Y1 in the third direction Y and a fourth wall part 164 positioned on the other side Y2 in the third direction Y.

The second cover member 17 is formed symmetric to the first cover member 16 in the first direction Z. In the second cover member 17, a recess 175 which opens to one side Z1 in the first direction Z is formed. As shown in FIG. 12 and FIG. 13, in the second cover member 17, the recess 175 is surrounded by a first wall part 171 positioned on one side X1 in the second direction X, a second wall part 172 positioned on the other side X2 in the second direction X, a third wall part 173 positioned on one side Y1 in the third direction Y, and a fourth wall part 174 positioned on the other side Y2 in the third direction Y.

(Magnetic Drive Circuit)

Figure 14:
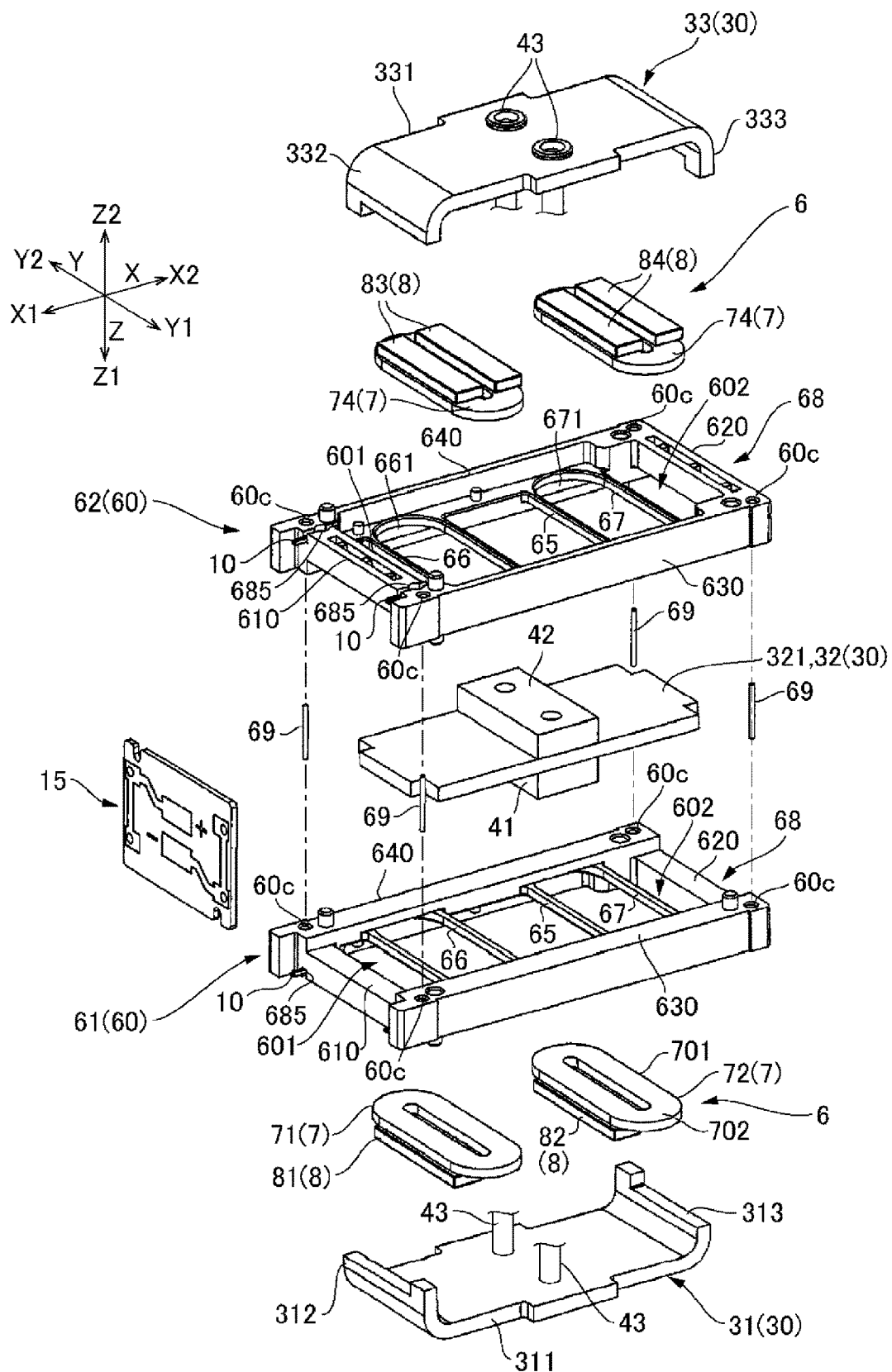
FIG. 14 is a perspective exploded view of a magnetic drive circuit, yokes and holders of the actuator of Embodiment 4.

FIG. 14 is a perspective exploded view of a magnetic drive circuit 6, a yoke 30 and a holder 60 of the actuator 1D of Embodiment 4. The magnetic drive circuit 6 has coils 7 and magnets 8 opposed to the coil 7 in the first direction Z. As shown in FIG. 12 and FIG. 14, in Embodiment 4, the coils 7 consist of two coils 71 and 72 arranged side by side in the second direction X and two other coils 73 and 74 arranged side by side in the second direction X on the other side Z2 in the first direction Z of the coils 71 and 72; the coil 7 is an elongated air core coil having its longitudinal sides 701 (the effective part) in the third direction Y. The coils 7 are held in the holder 60.

(Holder)

As shown in FIG. 13 and FIG. 14, the holder 60 consists of a first holder portion 61 and a second holder portion 62 which contacts the first holder portion 61 from the other side Z2 in the first direction Z. The holder portion 62 is formed symmetric to the first holder portion 61 in the first direction Z. In the first holder portion 61 and the second holder portion 62, through holes 60C are created at one pair of diagonal positions and at the other pair of diagonal positions. The through holes 60C are arranged at positions at which the first holder portion 61 and the second holder portion 62 contact each other in the first direction Z. Positioning pins 69 are inserted in the four through holes 60C. By the positioning pins 69, the first holder portion 61 and the second holder portion 62 are positioned in the direction which perpendicularly intersects with the first direction Z and joined together.

In the first holder portion 61 and the second holder portion 62, two coil retaining holes 66 and 67 are created side by side in the second direction X; the coils 7 are positioned in the coil retaining holes 66 and 67. In the coil retaining holes 66 and 67, receiving portions 661 and 671 are respectively formed. When the coils 7 are placed in the coil retaining holes 66 and 67, the short sides 702 (the ineffective part) of the coils 7 are supported by the receiving portions 661 and 671 in the first direction Z. In this position, the coils 7 are fixed to the first holder portion 61 and the second holder portion 62 by an adhesive.

The first holder portion 61 and the second holder portion 62 each have a first wall part 610, a second wall part 620, a third wall part 630 and a fourth wall part 640 respectively on one side X1 in the second direction X, the other side X2 in the second direction X, one side Y1 in the third direction Y and the other side Y2 in the third direction Y around the coil retaining holes 66 and 67. Between the coil retaining hole 66 and the first wall part 610 is formed a first opening portion 601; between the coil retaining hole 67 and the second wall is created a second opening portion 602. The first opening portion 601 and the second opening portion 602 are made through the holder 60 in the first direction Z.

In the first wall parts 610 of the first holder portion 61 and the second holder portion 62, terminal pin retaining grooves 685 are created. The terminal pin retaining grooves 685 are created at both ends of the first wall 610 in the third direction Y to retain a terminal pin 10 each. The terminal pin retaining grooves 685 are communicated to the inside of the first wall 610; lead wires (not shown in the figure) pulled out from the coils 7, which are arranged inside the first wall 610, are pulled into the terminal pin retaining grooves 685 and connected to the terminal pins 10. At the outside surface of the holder 60 on one side X1 in the second direction X, two terminal pins 10 protrude from each of the terminal pin retaining grooves 685 of the first holder portion 61 and the second holder portion 62. Those four terminal pins 10 are inserted into holes in the wiring board 15 and connected to the land formed on the surface of the wiring board 15.

(Movable Body)

As shown in FIG. 12 and FIG. 14, the movable body 3 is provided with the yoke 30 composed of a magnetic plate and magnets 8 fixed to the yoke 30. The yoke 30 consists of a first yoke 31 having a first plate portion 311, a second yoke 32 having a second plate portion 321 which is positioned on the other side Z2 in the first direction Z of the first plate portion 311, and a third yoke 33 having a third plate portion 331 which is positioned on the other side Z2 in the first direction Z of the second plate portion 321; the first plate portion 311, the second plate portion 321 and the third plate portion 331 extend parallel to each other in the second direction X. As shown in FIG. 12, the second plate portion 321 is positioned between the coils 71, 72 held in the first holder portion 61 and the coils 73, 74 held in the second holder portion 62. The magnets 8 consist of magnets 81 and 82 facing the coils 71 and 72 in the first direction Z and magnets 83 and 84 facing the coils 73 and 74 in the first direction Z. The magnets 81 and 82 are fixed on the surface of the first plate portion 311 facing the coils 7; the magnets 83 and 84 are fixed on the surface of the third plate portion 331 facing the coils 7.

The coils 7 each are a flat coil having its thickness direction in the first direction Z. The magnets 81 and 82 and the magnets 83 and 84 are respectively composed of two rectangular magnets and arranged to face the longitudinal sides 701 of the coils 7 in the first direction Z. The magnets 8 are each formed in a flat plate shape having the thickness direction thereof in the first direction Z and extending in the second direction X and the third direction Y. The magnet 8 is polarized and magnetized in the thickness direction (the first direction Z).

The first yoke 31 has a first joining plate portion 312, which extends from the end portion of the first plate portion 311 on one side X1 in the second direction X toward the other side Z2 in the first direction Z to the position it touches the second yoke 32 and is joined with the second yoke 32 by welding, and a second joining plate portion 313, which extends from the end portion of the first plate portion 311 on the other side X2 in the second direction X toward the other side Z2 to the position it touches the second yoke 32 and is joined with the second yoke 32 by welding. The first joining plate portion 312 passes through the first opening portion 601 in the first holder portion 61 as extending on one side X1 in the second direction X of the coil 71. The second joining plate portion 131 passes through the second opening portion 602 in the holder 61 as extending on the other side X2 in the second direction X of the coil 72.

The third yoke 33 is formed symmetric to the first yoke 31 in the first direction Z. The third yoke 33 has a third joining plate portion 332, which extends from the end portion of the third plate portion 331 on one side X1 in the second direction X toward the one side Z1 in the first direction Z to the position it touches the second yoke 32 and is joined with the second yoke 32 by welding, and a fourth joining plate portion 333, which extends from the end portion of the third plate portion 331 on the other side X2 in the second direction X toward the one side Z1 in the first direction Z to the position it touches the second yoke 32 and is joined with the second yoke 32 by welding. The third joining plate portion 332 passes through the first opening portion 601 of the second holder portion 62 as extending on one side X1 in the second direction X of the coil 73. The fourth joining plate portion 333 passes through the second opening portion 602 as extending on the other side X2 in the second direction X of the coil 74.

The yoke 30 has a first weight 41 and a second weight 42 fixed thereto so that the movable body 3 is ensured to have enough weight. The first weight 41 is arranged between the first plate portion 311 and the second plate portion 321 of the yoke 30; the second weight 42 is arranged between the second plate portion 321 and the third plate portion 331 of the yoke 30. The first weight 41 and the second weight 42 are positioned in the center of the yoke 30 in the second direction X; the first weight 41 is positioned between the coil 7-magnet 8 (the coil 71 and the magnet 81) and the coil 7-magnet 8 (the coil 72 and the magnet 82) arranged side by side in the second direction X. Also, the second weight 42 is positioned between the coil 7-magnet 8 (the coil 73 and the magnet 83) and the coil 7-magnet 8 (the coil 74 and the magnet 84) arranged side by side in the second direction X.

The first weight 41 and the second weight 42 are fixed to the yoke 30 by rivets 43. As shown in FIG. 14, the first weight 41 and the second weight 42 have the width wider in the third direction Y than in the second direction X; the rivets 43 are arranged at two places separated in the third direction Y. Through holes are created in each of the first weight 41, the second weight 42, the first plate portion 311, the second plate portion 321, and the third plate portion 331 of the yoke 30 so that the rivets 43 pass through in the first direction Z.

As shown in FIG. 12 and FIG. 14, a weight-placing hole 65 is created between the two coil retaining holes 66 and 67 in both the first holder portion 61 and the second holder portion 62. The first weight 41 is positioned in the weight-placing hole 65 in the holder 61; the second weight 42 is positioned in the weight-placing hole 65 in the second holder portion 62. The weight-placing hole 65 is one size larger than the first weight 41 or the second weight 42. When the movable body 3 is greatly moved in the second direction X, the first weight 41 and the second weight 42 collide with the inside circumferential surface of the weight-placing hole 65 to function as a stopper to restrict the moving range of the movable body 3 in the second direction X.

The third joining plate 332 and the fourth joining plate 333 of the third yoke 33 are opposed to the inside circumferential surfaces of the first opening portion 601 and the second opening portion 602 of the second holder portion 62 in the second direction X. Therefore, when the movable body 3 is greatly moved in the second direction X, the third joining plate 332 and the fourth joining plate 333 collide with the inside circumferential surfaces of the first opening portion 601 and the second opening portion 602 to function as a stopper to restrict the moving range of the movable body 3 in the second direction X. The same stopper function is designed between the first joining plate 312 and the second joining plate 313 of the first yoke 31 and the inside circumferential surfaces of the first opening portion 601 and the second opening portion 602 of the first holder portion 61.

(Viscoelastic Member)

As shown in FIG. 12, viscoelastic members 9 are arranged at positions at which the support body 2 and the movable body 3 face each other in the first direction Z. In Embodiment 4, the viscoelastic members 9 consist of first viscoelastic members 91 arranged at the positions at which the first yoke 31 of the movable body 3 and the first cover member 16 of the support body 2 face each other in the first direction Z and second viscoelastic members 92 arranged at the positions at which the third yoke 33 of the movable body 3 and the second cover member 17 of the support body 2 face each other in the first direction Z. More specifically described, the two first viscoelastic members 91 are arranged between the first plate portion 311 of the first yoke 31 and the bottom portion of the recess 165 in the first cover member 16; the two second viscoelastic members 92 are arranged between the third plate portion 331 of the third yoke 33 and the bottom portion of the recess 175 in the second cover member 17.

At the center in the second direction X of the recess 165 in the first cover member 16, a rib 168 extending in the third direction Y is provided. At three positions in the rib 168, which are at both ends in the third direction Y and the center, are formed first protrusions 169 protruding toward the other side Z2 in the first direction Z. The first viscoelastic members 91 are arranged on both sides of the rib 168 in the second direction X. In the same manner, at the center in the second direction X of the recess 175 in the second cover member 17, a rib 178 extending in the third direction Y is formed; at three positions in the rib 178, which are at both ends in the third direction Y and the center, are formed second protrusions 179 protruding toward the other side Z2 in the first direction Z. The second viscoelastic members 92 are arranged on both sides of the rib 178 in the second direction X.

The first viscoelastic members 91 and the second viscoelastic members 92 are arranged having the thickness direction thereof in the first direction Z and each extends in the second direction X and in third direction Y as a flat plate. Also, the first viscoelastic members 91 are arranged between the first plate portion 311 of the first yoke 31 and the bottom portion of the recess 165 of the first cover member 16 while compressed in the first direction Z; the second viscoelastic members 92 are arranged between the third plate portion 331 of the third yoke 33 and the bottom portion of the recess 175 of the second cover member 17 while compressed in the first direction Z. A first protrusion 169 formed to the first cover member 16 and a second protrusion 179 formed to the second cover member 17 function as a stopper to regulate the amount of compression collapse of the first viscoelastic member 91 and the second viscoelastic member 92 in the first direction Z.

(Major Effects of Embodiment 4)

As described above, the actuator 1D of Embodiment 4 is configured in the same manner as Embodiment 1 through 3 such that the viscoelastic members 9 are arranged at the positions at which the support body 2 and the movable body 3 face each other in the first direction Z and the magnetic drive circuit 6 drives the movable body 3 in the second direction X which crosses the first direction Z. Also, the viscoelastic members 9 are arranged having the thickness direction thereof in the first direction Z between the movable body 3 and the support body 2; when the movable body 3 moves in the second direction X relative to the support body 2, the viscoelastic members 9 deforms in the shearing direction. That is, when the movable body 3 moves (vibrates) in the second direction X, the viscoelastic members 9 deform in the direction (the shearing direction) which crosses the thickness direction (the axial direction). Therefore, in the same manner as Embodiment 1 through 3, resonance can be restrained when the movable body 3 is vibrated. Also, reproducibility of vibration acceleration corresponding to the input signals can be improved by utilizing the spring elements of the viscoelastic members 9 in the shearing direction; therefore, vibrations can be actualized with delicate nuances. Further, when the viscoelastic members 9 are pressed and compressed in the thickness direction (the axial direction) between the movable body 3 and the support body 2, the viscoelastic members 9 can be prevented from greatly deforming; therefore, the gap between the movable body 3 and the support body 2 can be prevented from greatly varying.

Embodiment 5

Figure 15:
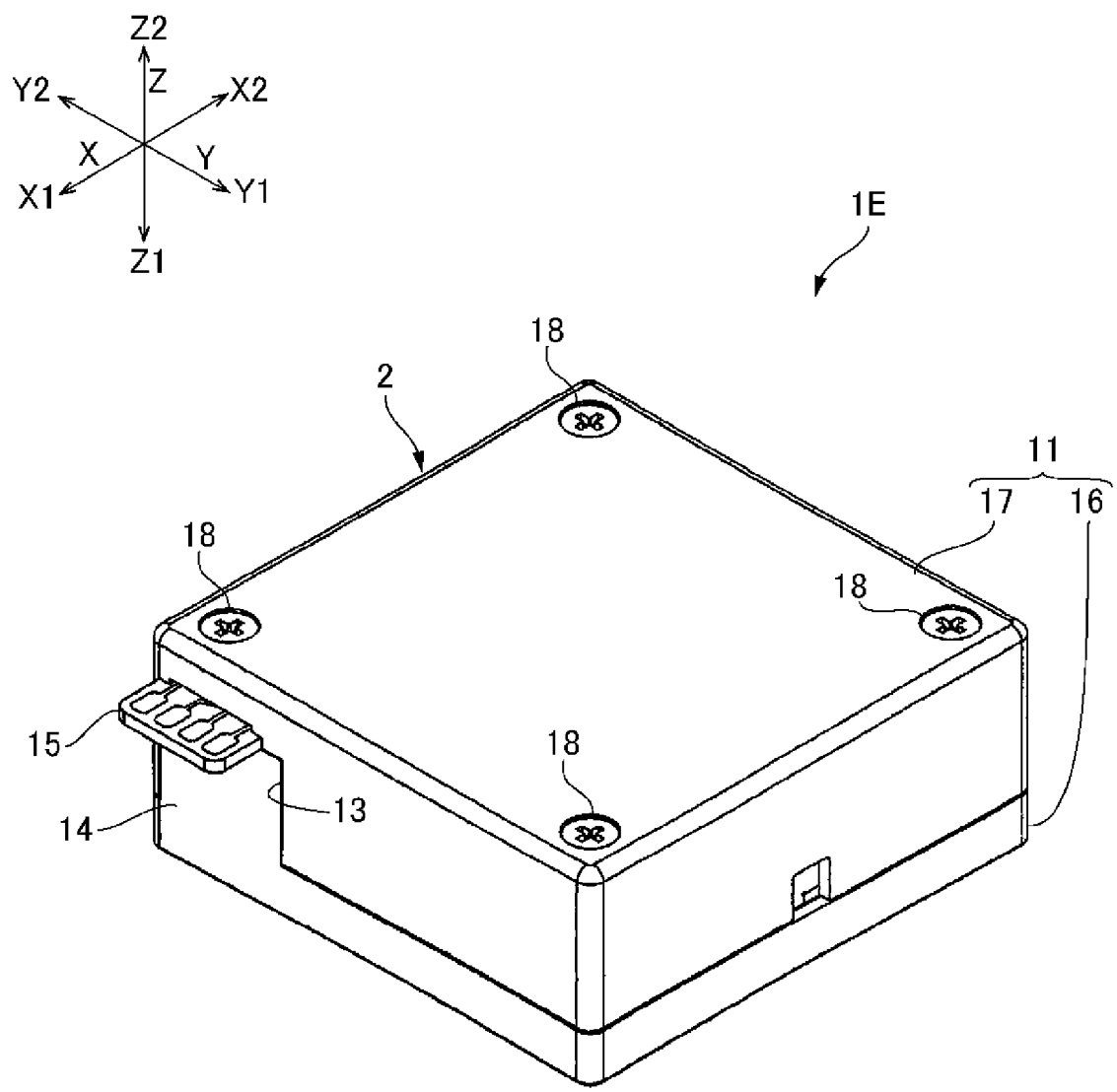
FIG. 15 is a perspective view of an actuator of Embodiment 5 of the present invention.
Figure 16:
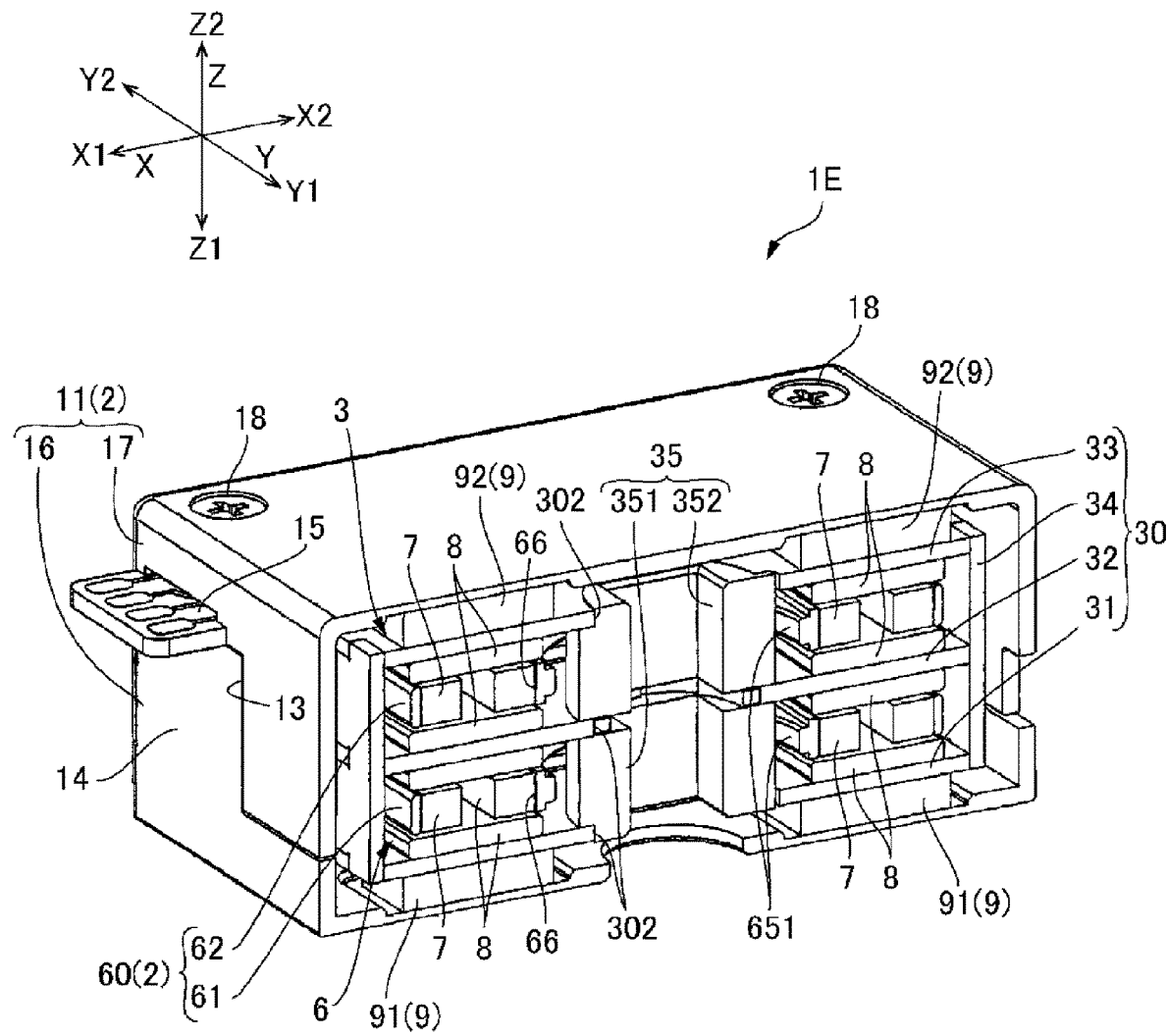
FIG. 16 is an XZ cross-sectional view of the actuator of Embodiment 5.
Figure 17:
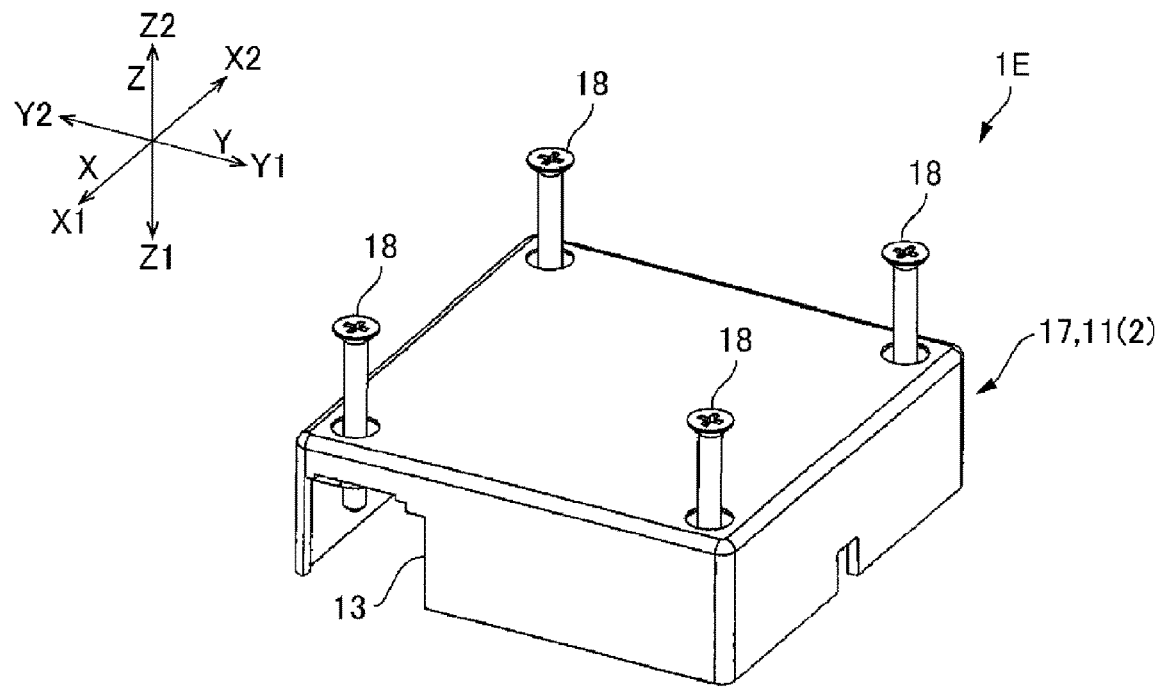
FIG. 17 is a perspective exploded view of the actuator of Embodiment 5.
Figure 17:
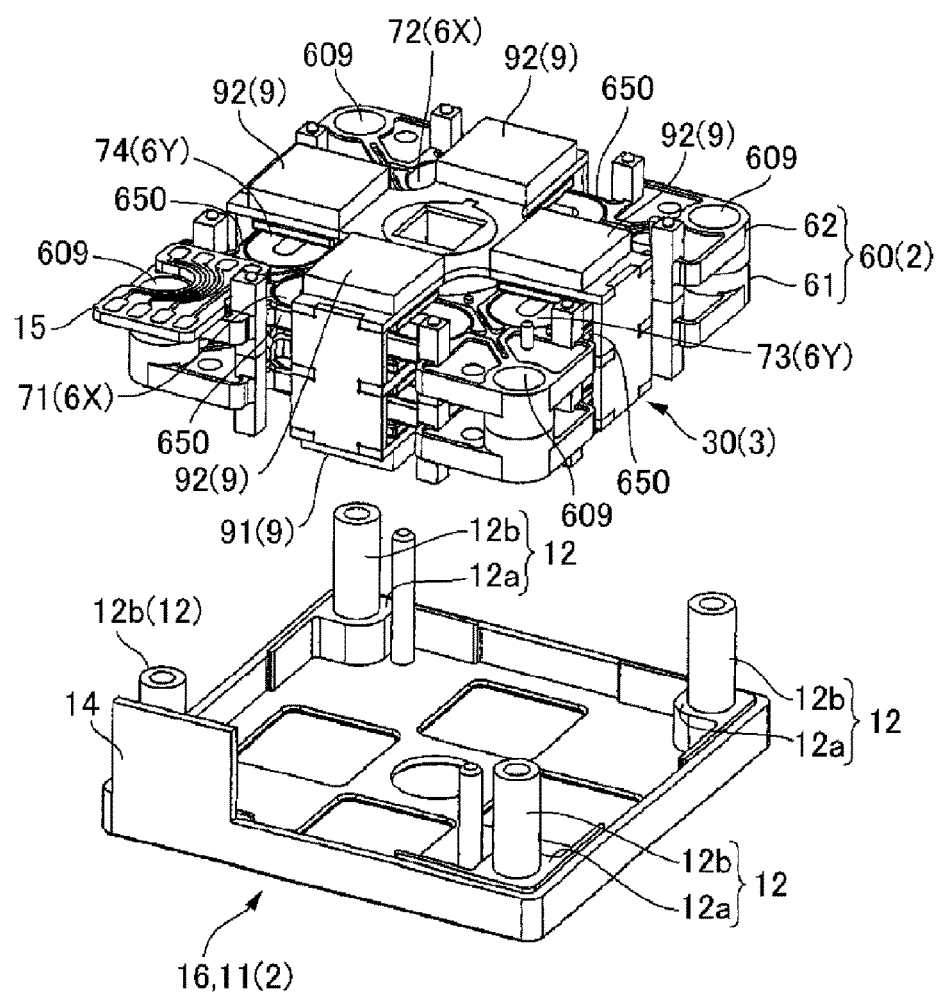

FIG. 15 is a perspective view of an actuator 1E of Embodiment 5 of the present invention. FIG. 16 is an XZ cross-sectional view of the actuator 1E of Embodiment 5. FIG. 17 is a perspective exploded view of the actuator 1E of Embodiment 5. In the actuator 1E of Embodiment 5, a magnetic drive circuit 6 consists of a first magnetic drive circuit 6X which vibrates the movable body 3 in the second direction X and a second magnetic drive circuit 6Y which vibrates the movable body 3 in the third direction Y.

(Support Body)

As shown in FIG. 15 and FIG. 16, in the actuator 1E of Embodiment 5, a support body 2 has a cover 11 and a holder 60, and the holder 60 and the movable body 3 are arranged inside the cover 11. The cover 11 consists of a first cover member 16 positioned on one side Z1 in the first direction Z and a second cover member 17 laid on the first cover member 16 from the other side Z2 in the first direction Z. The first cover member 16 and the second cover member 17 are each rectangular when viewed from the first direction Z and fixed together by four screws 18. As shown in FIG. 17, at a pair of one diagonal positions and at a pair of the other diagonal positions in the first cover member 16, boss portions 12 are formed protruding toward the second cover member 17. Each of the boss portions 12 is provided with a step surface 12a formed at the intermediate position in the first direction Z and a cylindrical portion 12b protruding from the step surface 12a toward the other side Z2 in the first direction Z. The screws 18 are screwed into the cylindrical portions 12b which are inserted to the holes in the second cover member 17.

In the second cover member 17, a notch 13 is created by cutting the side surface on one side X1 in the second direction X toward the other side Z2 in the first direction Z. The first cover member 16 has a rising part 14 which is to be opposed to the notch 13 in the first direction Z. The rising part 14 creates a slit with the notch 13 to position the wiring board 15. To the wiring board 15, a lead wire is connected to supply electricity to coils 7.

Figure 18:
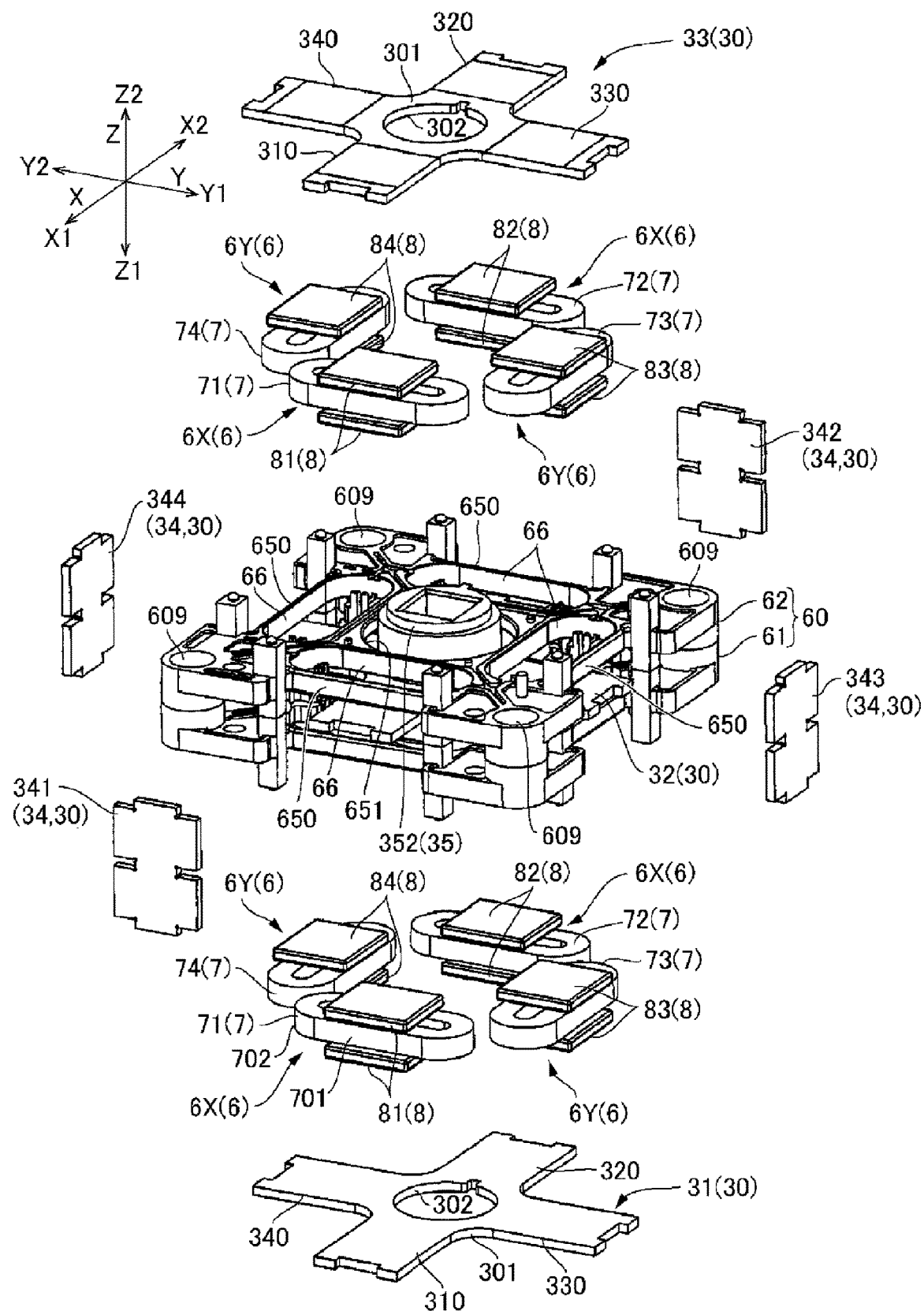
FIG. 18 is a perspective exploded view of a magnetic drive circuit, yokes and holders of the actuator of Embodiment 5.

FIG. 18 is a perspective exploded view of a magnetic drive circuit 6, the yoke 30 and the holder 60 of the actuator 1E of Embodiment 5. As shown in FIG. 17 and FIG. 18, circular holes 609 are bored at four corners of the holder 60. The boss portions 12 are inserted in the circular holes 609 so that the holder 60 is held being placed on the step surfaces 12a. The holder 60 consists of a first holder portion 61 and a second holder portion 62 which contacts the first holder portion 61 from the other side Z2 in the first direction Z. The first holder portion 61 is formed symmetrical to the second holder portion 62 in the first direction Z.

In the center of each of the four sides of either the first holder portion 61 or the second holder portion 62, the recess portion 650 denting inwardly is formed. Coils 71 and 72 of the first magnetic drive circuit 6X are held inside two recess portions 650 which are opposed to each other in the second direction X. Coils 73 and 74 of the second magnetic drive circuit 6Y are held inside two recess portions 650 which are opposed to each other in the third direction Y. The coils 71 and 72 are each a flat air core coil having the longitudinal side thereof, which is the effective side, in the third direction Y; the coils 73 and 74 are each also a flat air core coil having the longitudinal side thereof, which is the effective side, in the second direction X. The coils 71 and 72 or the coils 73 and 74 are respectively held in the elongated coil retaining holes 66 created in the first holder portion 61 or the second holder portion 62. In the center of the first holder portion 61 or the second holder portion 62, a circular hole 651 is formed.

(Movable Body)

The movable body 3 is provided with the yoke 30 composed of a magnetic plate and magnets 8 fixed to the yoke 30. As shown in FIG. 16 and FIG. 18, the yoke 30 consists of a first yoke 31, a second yoke 32 arranged on the other side Z2 in the first direction Z from the first yoke 31, and a third yoke 33 positioned on the other side Z2 in the first direction Z from the second yoke 32. Also, the yoke 30 has joining members 34 for positioning and joining the first yoke 31, the second yoke 32 and the third yoke 33 together. The joining members 34 are formed of a magnetic material and are joined with the first yoke 31, the second yoke 32 and the third yoke 33 by welding, being part of the yoke 30.

Figure 19:
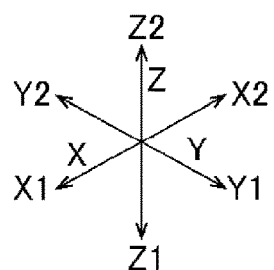
FIG. 19 is a perspective exploded view of a magnetic drive circuit and yokes of the actuator of Embodiment 5.
Figure 19:
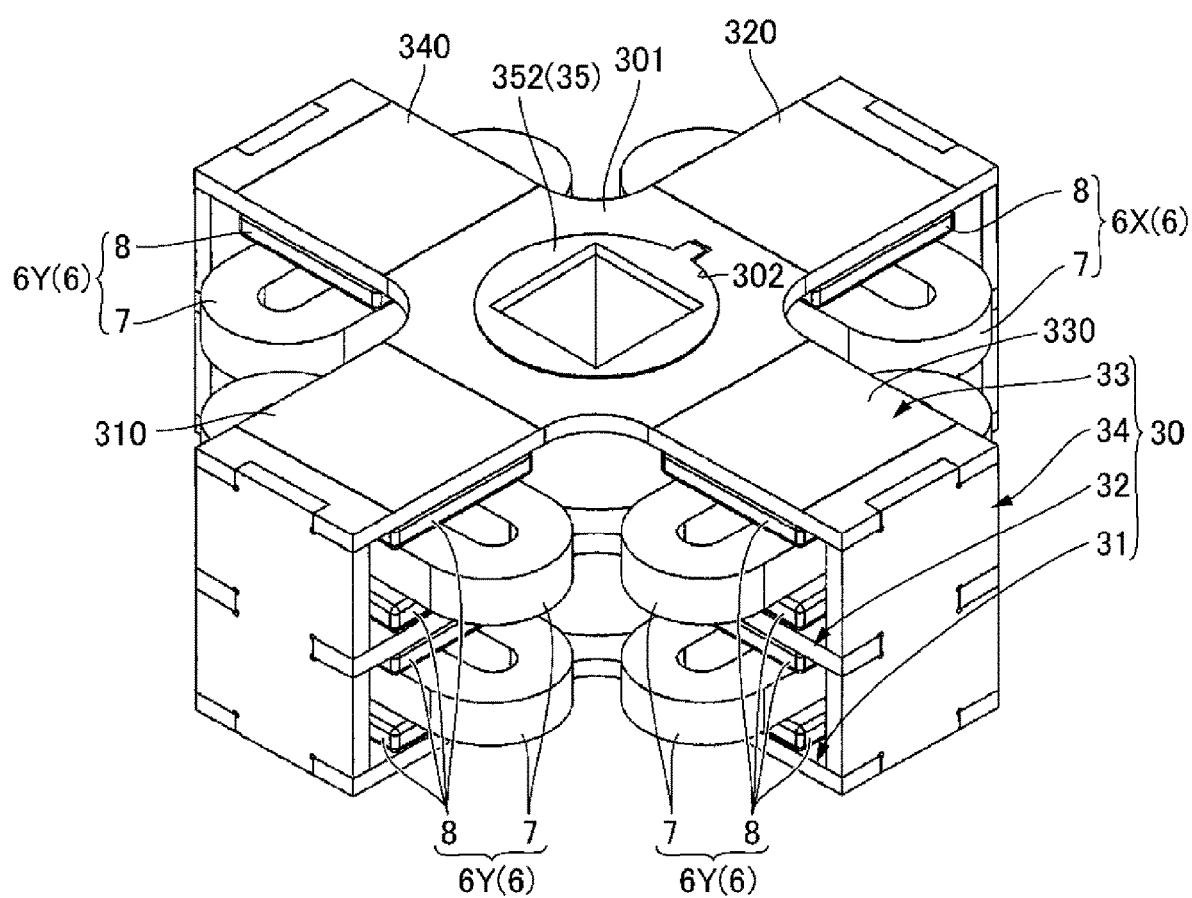

FIG. 19 is a perspective view of the magnetic drive circuit 6 and the yoke 30 of Embodiment 5. The first yoke 31, the second yoke 32 and the third yoke 33 are plate-like members, which are arranged perpendicular to the first direction Z, and are in the same shape when viewed in the first direction Z. The first yoke 31, the second yoke 32 and the third yoke 33 are respectively in a cross shape when viewed in the first direction Z. The first yoke 31, the second yoke 32 and the third yoke 33 each have a center portion 301 having a circular hole 302 formed therein, a first arm portion 310 and a second arm portion 320 protruding from the center portion 301 toward one side X1 and the other side X2 in the second direction X, and a third arm portion 330 and a fourth arm portion 340 protruding from the center portion 301 toward one side Y1 and the other side Y2 in the third direction Y.

As shown in FIG. 16, the first yoke 31 is arranged between the first holder portion 61 and the cover member 16. The second yoke 32 is arranged between the first holder portion 61 and the second holder portion 62; the third yoke 33 is arranged between the second holder portion 62 and the second cover member 17. The magnets 8 consist of magnets 8 fixed on the surface of the first yoke 31 which faces the coils 7 held in the first holder portion 61, magnets 8 fixed on both surfaces of the second yoke 32 (that is, the surface facing the coils 7 which are held in the first holder portion 61 and the surface facing the coils 7 which are held in the second holder portion 62), and magnets 8 fixed to the surface of the third yoke 33 which faces the coils 7 held in the second holder portion 62. In other words, in Embodiment 5, the magnets 8 are arranged on both sides in the first direction Z of the coils 7 held in the first holder portion 61, and on both sides in the first direction Z of the coils 7 held in the second holder portion 62.

The magnets 8 consist of magnets 81 and 82 which respectively face the coils 71 and 72 in the first direction Z in the first magnetic drive circuit 6X and magnets 83 and 84 which respectively face the coils 73 and 74 in the first direction Z in the second magnetic drive circuit 6Y. The magnets 81 are fixed to the first arm portion 310 of each yoke; the magnets 82 are fixed to the second arm portion 320 of each yoke; the magnets 83 are fixed to the third arm portion of each yoke; the magnets 84 are fixed to the fourth arm portion 340 of each yoke. Each magnet 8 is polarized and magnetized in the thickness direction. The two magnets 8 which face the coil 7 from one side Z1 and from the other side Z2 in the first direction Z are magnetized to different polarities with the surfaces facing the coil 7.

As shown in FIG. 19, the yoke 30 is an assembly of the first yoke 31, the second yoke 32, the third yoke 33 and joining members 34. The joining members 34 are a first linking piece 341 for linking the front ends of the first arm portions 310 of the first yoke 31, the second yoke 32 and the third yoke 33, a second linking piece 342 for linking the front ends of the second arm portions 320 of the first, second and third yokes, a third linking piece 343 for linking the front ends of the third arm portions 330 of the first, second and third yokes, and a fourth linking piece 344 for linking the front ends of the fourth arm portions 340 of the first, second and third yokes. Each joining member 34 is joined to the yokes such that the end portion of the first yoke 31 is joined to the end portion thereof on one side Z1 in the first direction Z at right angles, and the third yoke 33 is joined to the end portion thereof on the other side Z2 in the first direction Z at right angles. To the center of the joining member 34, the end portion of the second yoke 32 is joined at right angles.

The first yoke 31 is positioned to be on the same plane as the end surface of the joining member 34 on one side Z1 in the first direction Z; the third yoke 33 is positioned to be on the same plane as the end surface of the joining member 34 on the other side Z2 in the first direction Z. Therefore, the height of the yoke 30 in the first direction Z coincides with the height of the joining member 34 in the first direction Z. As shown in FIG. 17, etc., as the yoke 30 is assembled and mounted to the holder 60, the joining members 34 are positioned in the gap between the recess portion 650 in the holder 60 and the second cover member 17. Therefore, when the movable body 3 moves in the second direction X or the third direction Y, the joining members 34 hit the inside surface of the recess portion 650 or the inside surface of the second cover member 17 to limit the movable range of the movable body 3 in the second direction X and the third direction Y, thus functioning as a stopper.

As shown in FIG. 16, a shaft 35 extending in the first direction Z is attached in the center portions 301 of the first yoke 31, the second yoke 32, and the third yoke 33. The shaft 35 passes through the circular holes 651 formed in the center of the first holder portion 61 and the second holder portion 62. The shaft 35 is configured by a first shaft portion 351 positioned between the first yoke 31 and the second yoke 32 and a second shaft portion 352 which is connected to the other side Z2 of the first shaft portion 351 in the first direction Z and positioned between the second yoke 32 and the third yoke 33. The end portions of the first shaft portion 351 and the second shaft portion 352 are fitted to the circular holes 302 created in the centers 301 of the first yoke 31, the second yoke 32 and the third yoke 33.

(Viscoelastic Member)

As shown in FIG. 16, even in Embodiment 5, viscoelastic members 9 are arranged at positions at which the support body 2 and the movable body 3 face each other in the first direction Z. In Embodiment 5, the viscoelastic members 9 consist of first viscoelastic members 91 which are arranged at positions at which the first yoke 31 of the movable body 3 and the first cover member 16 of the support body 2 face each other in the first direction Z and second viscoelastic members 92 which are arranged at a position at which the third yoke 33 of the movable body 3 and the second cover member 17 of the support body 2 face each other in the first direction Z. In Embodiment 5, the first viscoelastic members 91 are arranged at four positions at which the first arm portion 310, the second arm portion 320, the third arm portion 330, and the fourth arm portion 340 of the first yoke 31 respectively face the first cover member 16 in the first direction Z. The second viscoelastic members 92 are arranged at four places at which the first arm portion 310, the second arm portion 320, the third arm portion 330 and the fourth arm portion 340 of the third yoke 33 respectively face the second cover member 17 in the first direction Z.

The first viscoelastic members 91 and the second viscoelastic members 92 are arranged having the thickness direction thereof in the first direction Z and extending in the second direction X and the third direction Y which are perpendicularly intersecting with the first direction Z. Also, the first viscoelastic members 91 and the second viscoelastic members 92 are each in a square shape when viewed in the first direction Z and have the same dimensions in the second direction X and the third direction Y. The first viscoelastic members 91 are arranged between the first yoke 31 and the first cover member 16 while compressed in the first direction Z; the second viscoelastic members 92 are arranged between the third yoke 33 and the second cover member 17 while compressed in the first direction Z. The first viscoelastic members 91 and the second viscoelastic members 92 are bonded with the surface thereof contacting the support body 2 and with the surface thereof contacting the movable body 3.

(Major Effects of Embodiment 5)

As described above, in the actuator 1E of Embodiment 5, the viscoelastic members 9 are arranged at positions at which the support body 2 and the movable body 3 face each other in the first direction Z, and the first magnetic drive circuit 6X drives the movable body 3 in the second direction X crossing the first direction Z and the second magnetic drive circuit 6Y drives the movable body 3 in the third direction Y crossing the first direction Z. Also, the viscoelastic members 9 are arranged having the thickness direction thereof in the first direction Z between the movable body 3 and the support body 2; when the movable body 3 is moved relative to the support body 2 in the second direction X or the third direction Y, the viscoelastic members 9 deform in the direction (the shearing direction) which crosses the thickness direction (the axial direction). Therefore, in the same manner as Embodiment 1 through 4, resonance caused when the movable body 3 is vibrated can be restricted. Also, reproducibility of vibration acceleration corresponding to the input signals can be improved by utilizing the spring elements of the viscoelastic members 9 in the shearing direction; therefore, vibrations can be actualized with delicate nuances. Further, when pressed and compressively deformed in the thickness direction thereof (the axial direction) between the movable body 3 and the support body 2, the viscoelastic members 9 are restrained from greatly deforming; therefore, the gap between the movable body 3 and the support body 2 is kept from largely varying.

What is claimed is:

1. An actuator comprising:
a support body;
a movable body supported to be movable relative to the support body;
a magnetic drive circuit, having a coil and a magnet which faces the coil in a first direction to move the movable body relative to the support body in a second direction crossing the first direction; and
a viscoelastic member, arranged at a position at which the support body and the movable body face each other in the first direction;
wherein
the viscoelastic member is positioned having a thickness direction thereof in the first direction;
when the movable body is moved relative to the support body in the second direction, the viscoelastic member deforms in a shearing direction;
wherein the support body includes: a cover for accommodating the movable body and the magnetic drive circuit therein, and a holder for supporting the coil;
the coil is arranged in a coil retaining hole that penetrates the holder in the first direction;
the movable body includes a yoke for holding the magnet;
the yoke includes: a first plate part facing the coil on one side in the first direction, and a second plate part facing the coil on the other side in the first direction;
the viscoelastic member is arranged at a location where the first plate part and the holder face each other in the first direction, and a location where the second plate part and the holder face each other in the first direction.

2. The actuator as set forth in claim 1, wherein
the coil is a flat coil having the thickness direction thereof in the first direction;
the magnet is a flat plate magnet having the thickness direction in the first direction; and
the viscoelastic member extends in a direction which perpendicularly intersects with the first direction.

3. The actuator as set forth in claim 1, wherein
the viscoelastic member is arranged while compressed in the first direction.

4. The actuator as set forth in claim 1, wherein
the viscoelastic member is a gel-based damper member.

\* \* \* \* \*